(12) United States Patent
Pedersen

(10) Patent No.: US 6,232,959 B1
(45) Date of Patent: May 15, 2001

(54) CURSOR CONTROL DEVICE FOR 2-D AND 3-D APPLICATIONS

(76) Inventor: Steinar Pedersen, Kalkfjellet 21, N-1370, Asker (NO)

(*) Notice: Subject to any disclaimer, the term of this patent is extended or adjusted under 35 U.S.C. 154(b) by 0 days.

(21) Appl. No.: 08/930,005

(22) PCT Filed: Apr. 3, 1996

(86) PCT No.: PCT/NO96/00077

§ 371 Date: Sep. 29, 1997

§ 102(e) Date: Sep. 29, 1997

(87) PCT Pub. No.: WO96/31836

PCT Pub. Date: Oct. 10, 1996

(30) Foreign Application Priority Data

Apr. 3, 1995 (NO) .................................................. 951274

(51) Int. Cl.[7] .................................................. G09G 5/08
(52) U.S. Cl. .................................................. 345/161; 345/168
(58) Field of Search .................................................. 345/157, 161, 345/163, 165, 166, 167; 341/2; 202/153

(56) References Cited

U.S. PATENT DOCUMENTS

| 4,409,479 | * 10/1983 | Sprague | 250/237 G |
| 4,713,535 | 12/1987 | Rhoades. | |
| 4,782,327 | * 11/1988 | Kley et al. | 341/2 |
| 4,935,728 | * 6/1990 | Kley | 345/161 |
| 5,227,985 | * 7/1993 | DeMenthon | 702/153 |

* cited by examiner

*Primary Examiner*—Steven Saras
*Assistant Examiner*—Fritz Alphonse
(74) *Attorney, Agent, or Firm*—Sughrue, Mion, Zinn, Macpeak & Seas, PLLC

(57) ABSTRACT

A device for remote positioning and control of graphic representations of objects (e.g. cursors) projected on a computer screen or in a "virtual space", and for control of physical objects e.g. in robotics; comprising a finger-or hand-grippable member (2) resiliently mounted on a plate support (3) functioning as control elements, and means for determining the spatial orientation of the control elements relative to reference planes, utilizing laser beams and addressable sensor arrays (7); and further means for translating said position information to electronic signals indicative thereof, said signals being provided to an object control means.

37 Claims, 13 Drawing Sheets

CURSOR CONTROL DEVICE FOR 2-D AND 3-D APPLICATIONS

The present invention relates to an input device intended for remote positioning and control of graphic representations of two- or three-dimensional objects (e.g. cursors) projected on a computer screen or in a 'virtual space' created by visualising devices, and for control of physical objects e.g. in robotics.

The most important reason why computer use is steadily increasing is probably related to the development of software which is generally applicable, in addition to a simplified interaction between user and hardware enabling the layman without special computer training to operate the system without any particular difficulties. In addition to the traditional data input and program activation via the keyboard, the user can now enter information and execute commands by selecting among menus and graphic symbols appearing on the computer screen.

On present-day computers, this selection and execution is generally accomplished by use of several different input devices, of which the most popular are the mouse, the track-ball, the touch pad and the "pin-mouse".

The electromechanical "grandfather" mouse was developed at Stanford Research Institute and is disclosed in U.S. Pat. No. 3,541,541. This mouse employs a pair of wheels that turn potentiometer shafts to encode X and Y motion into analog signals. Further development led to the employment of a ball or sphere instead of two wheels for more uniform tracking. In a typical "mouse" system, a hand-held transducer provides positional movement signals to the display system. Traditionally, the movement of wheels within the cursor control device are coupled to potentiometers to provide signals indicative of an X-Y position on the display screen (U.S. Pat. Nos. 3,304,434; 3,541,541; 3,269,190; 3,835,464; 3,892,963 and 3,987,685). Other mouse systems utilise rotating balls on wheels which are in turn coupled to rotate apertures interrupting beams of light, thereby providing positional signals to the display system (U.S. Pat. Nos. 3,892,963; 3,541,521; and 4,464,652). A trackball is similar to the mouse, but has the advantage that it can be incorporated in portable computers. Contrary to the mouse, however, this device remains stationary while the user rotates the ball with the thumb, fingers or palm of the hand. Examples of trackballs are shown in U.S. Pat. Nos. 5,122,654 and 5,008,528.

While these mice and trackballs have proved to be quite useful in performing display functions, they have not been outstandingly reliable, particularly over long periods of use. For example, the mechanical moving parts of the mouse, such as the balls and wheels, become dirty and slip on the work surface or pad, rather than provide continuous rolling action, or the commutators become dirty and skip. One goal in construction of new mouse varieties, therefore, has been to reduce the number of moving parts thereby eliminating the above mentioned mechanical disadvantages and providing a mouse with high reliability over long periods of time. One direction toward the goal of no moving parts is optical detection of mouse tracking functions. The concept of optical tracking, i.e., optical detection of an image, such as a track, lines, bars or grating, is not new. Examples of such tracking utilising one or more optical detectors are disclosed in U.S. Pat Nos. 3,496,364; 3,524,067; 4,114,034 and 4,180,704. However, none of these optical tracking devices disclose techniques suitable to perform the functions required in a cursor or object control device, i.e., they do not provide multi-directional tracking indicative of direction and amount of movement. U.S. Pat. No. 4,409,479 discloses a device which utilises optical sensing techniques to detect mouse motion. The output is indicative of the amount and direction of movement of the device relative to an orthogonal coordinate system. The device relies on a planar grid pattern comprising orthogonally positioned grid lines of uniform spacing. An alternative mode of optical tracking is described in U.S. Pat. No. 5,288,993 where a cursor pointing device includes a randomly speckled ball illuminated with diffuse lighting. An image of the illuminated area is focused by an optical element onto a photosensitive array. Logic associated with the photosensitive array determines movement of the ball across the array, and translates that movement into conventional cursor control signals supplied to a host system.

Another direction toward the goal of few moving parts is magneto-electric detection of tracking functions. The European patent application EP 0,539,599 describes a device that superficially looks like a trackball, and it is operated in the same manner. The device incorporates a dome-shaped slider with a strong magnet attached to the bottom surface. The housing is provided with a plurality of magneto-electric conversion elements. If the slider is slid, the magnetic flux density cutting across the magneto-electric conversion elements changes along with the output voltage. This change is used to control the position of the pointer. The described pointing device has furthermore means for changing from a position control to a speed control when the slider is moved beyond its confined sliding area. When shifting from positional control to speed control, the latest and the preceding positional information are used to find the vector between the two positions, and this vector is used for controlling cursor speed and direction. It is therefore not possible to change direction while using the speed control function.

The trackballs and the dome-shaped slider are operated using the thumb, which is not by itself trained for precise movement. Other systems employ index finger control or incorporate finger-grippable control elements, and are thus providing better precision. U.S. Pat. No. 4,736,191 describes a device that incorporates a finger pad actuator mounted to a base so as to be movable in several directions. The position of the finger pad is sensed, e.g. by variable resistance potentiometers, and used to control the movement of a cursor or other image on a computer screen. U.S. Pat. No. 4,680,577 describes a multipurpose cursor control keyswitch that moves laterally to provide cursor control and that moves vertically for character entry. Sensors, e.g. strain gauges or pressure sensors, are coupled to the key cap for sensing the lateral movement. An almost identical keyswitch is described in PCT/US89/05662, comprising a key cap that is displaceable within the horizontal plane with one finger. Displacement of the key cap results in similar directional movement of the cursor; vertical force applied to the key cap activates an electric switch which corresponds to the "click" of a mouse button. Several different transducers are suggested as means for detecting the displacement of the key cap in the horizontal plane (strain gauge, optical detector, capacitor, inductor, and contacts).

A specific limitation of many of the devices of the prior art is that the degree of precision control available is crude compared to the power and precision of the data processing devices themselves and detection of fine movements of the input devices is a particular limitation. Another reason for the lack of precision is that the devices are difficult to control because they do not conform to the user's ordinary motor skills and capabilities of the human musculature. The device described in U.S. Pat. No. 4,719,455 provides somewhat greater precision and conform more closely to the operator's motor skills, being operated by hand and finger movements, including both fine movement control and gross movement control. The assembly includes a graspable outer cover and an inner puck with a movable finger cup and a movement detector utilising a raster pattern created by a laser beam. Other prior art devices incorporate a single finger-grippable unit as a central control member. PCT/JP89/01148 utilises a pen-like member to input characters and symbols. The member is moved on a surface, passing a plurality of pre-set detection positions. Several paths of action are defined beforehand and correspond to characters, symbols and processing commands. The device is not intended for cursor control. A similar device intended for input of characters is described in PCT/CA90/00022, comprising a plurality of switches adapted to be activated by a disk movable with the tip of a pen. The device described in U.S. Pat. No. 4,935,728 employs two modes of moving a cursor in correspondence with movement of a finger-grippable element, wherein one of the modes produces a cursor movement proportional to the movement of the finger-grippable element and the second mode produces cursor movement which is dependent upon the distance from an edge of the display area. The second mode can be called by a movement greater than a predetermined rate or at a position within an outer ring area of the pointer area of movement. The device utilises an opto-electronic system for movement detection, where light beams traverse gratings in transparent walls of the detector member and generate pulses concurrent with the movement in two dimensions. A similar photoelectric cursor controller is described in EP 0,556,936, where a pair of plates slidably mounted for movement in two orthogonal directions contain gratings that create light pulses indicative of the extent of movement in the two directions. The plates are coupled to a finger-grippable control element.

The present author has developed a cursor control device as described in PCT/NO94/00113, where the central control element is a finger-grippable member attached to a single plate support, to which there are connected two separate signal generating means. The first, constituting an electromechanical, roller-based system or an opto-electronic system based upon the use of reflecting grids, is connected to the plate support and will sense the plate movement in any direction in the X-Y plane. A plate movement will instigate a congruent movement of the screen cursor. The second means is connected to the grippable member, and will sense an applied, pivotal or lateral force, utilising pressure sensors or opto-electronic sensing devices. It is argued that this invention has many of the advantages looked for in an ideal cursor control device.

The previously described devices are mainly intended to detect and convey motion within two dimensions. However, with the increased use of computers in representation and manipulation of information in three-dimensional space, attempts have been made to design devices that allow for control of objects in three dimensions. This is particularly true in the case of robotics, modelling, simulation, and animation of objects that are represented in either two or three-dimensional space. U.S. Pat. No. 3,898,445 relates to a means for determining the position of a target in three dimensions by measuring the time it takes for a number of light beams to sweep between reference points and the target. U.S. Pat. Nos. 4,766,423 and 4,812,829 disclose display and control devices and methods for controlling a cursor in a three-dimensional space by moving the cursor by use of joystick and throttle type devices to alter the direction and velocity of a cursor. U.S. Pat. No. 4,835,528 illustrates a cursor control system which utilises movement of a mouse device upon a two-dimensional surface that contains logically defined regions within which movement of the mouse is interpreted by the system to mean movement in three-dimensional space. An input device disclosed in U.S. Pat. No. 4,787,051 utilises a mouse equipped with inertial acceleration sensors to permit an operator to input three-dimensional spatial position. U.S. Pat. No. 5,181,181 describes a mouse which senses six degrees of motion arising from movement within three dimensions. The device includes accelerometers for sensing linear translation along three axes and angular rate sensors for sensing angular rotation. The UK patent application GB 2,247,938 describes a control device comprising a puck which slides on the surface of a platter, where the position of the puck is being detected capacitatively. The puck may also input pull push and rotatory information in addition to translational information, and it can thus be used for three-dimensional control.

The aforementioned input devices have a number of limitations, deficiencies and drawbacks. The most important are the following:

The movement of the mouse across a surface is guided by muscles that are not trained for very precise manoeuvring. Accordingly, the accompanying movement of the screen cursor is not particularly precise. While the mouse's precision is sufficient for most practical purposes, it is not very well suited for graphics and free-hand drawing. The mouse as a separate entity has furthermore limited applicability in conjunction with portable computers (laptops, notebooks, sub-notebooks and palmtops). Further, time is lost in ensuring precise positioning of the cursor over icons or symbols, in giving commands and in switching between keyboard input and mouse input. The ball and the rollers are easily coated with dirt, leading to an uncontrolled and erratic movement of the cursor after a short time in use. The movement of the hand guiding the mouse may furthermore cause injuries, particularly as a result of frequent use. Similar stress effects are seen with the touch pad (pointing pad).

The track-ball and similar thumb-operated devices provide inaccurate movement of the cursor. It is, however, less subject to dirt and wear than the classical mouse, and is well suited for incorporation in portable computers.

Finger- or hand-operated devices based on the joystick principle (e.g. the "track-point" and other keytop input devices) allow for rapid and unlimited movement of cursors. Although the operation may be simple and intuitive, such devices are not suitable for precision tasks.

Detection systems used in prior art devices are not very precise, and do not conform with the precision demanded by modern computer displays, for control in virtual space and for use in robotics. Even previously described laser-based detectors do not fully utilise the potential for precision inherent in this technology.

Prior art devices intended for multi-dimensional control lack the power of intuitive manipulation, and do not, by far, provide the precision needed for satisfactory object control e.g. in a three-dimensional, virtual space.

Ideally, the input device should be sufficiently exact to be used for multi-dimensional operations and for graphical computer work, allow for rapid and continuous movement of an object or cursor across a computer screen or in a virtual space, and for rapid and precise positioning and repositioning of the object, be well suited for precise and rapid interaction with computers and programs via a graphical interface (menus, icons, etc.), be suitable for incorporation both in stationary and portable computers, in a way that the same technique can be applied for all types of hardware, allow for complete integration in a keyboard or computer chassis, allow for unlimited cursor movement, allow for rapid execution of commands require minimum changes of grip during operation, provide logical cursor response, i.e. object or cursor responds as intuitively expected in two or three dimensions, have good ergonomic properties, have few movable parts, be suitable for modular construction; i.e. should allow to be put together to satisfy different demands, and be simple, durable, hard wearing and inexpensive.

The aforementioned device developed by the present author and described in PCT/NO94/00113 satisfies many of the above requirements, particularly because its main control member, the finger grip is handled according to a writing or drawing motion, and thereby utilises the high-precision motor skills of the hand, thumb and index finger in combination. However, the described embodiments of said invention do not fully exploit all potential control modes inherent in this device configuration. This is mainly due to the fact that the sensor systems employed do not allow a more extensive exploitation of control possibilities. This potential can only be realised if a totally different approach is taken to movement and position determination.

Most control devices utilise the movement of a control member to generate a signal indicative of direction and speed of movement. So is also the case with the detection system associated with the plate support member described in PCT/NO94/00113, which will generate two pulse-trains accompanying the plate's movement in the X- and the Y-direction. The number of pulses generated in each direction, and the speed by which the pulses are generated will reflect the control member's speed and direction of movement. Such pulse-trains can easily applied for cursor control. Other movement detecting systems described in prior art are generally less accurate.

These signal generating systems are not very well suited for use with more than two control modes; as a construction intended to accommodate several control modes will become very complicated, inaccurate and expensive.

The new device classes developed by the inventor and presented herein, are based on a similar configuration of control elements as is described in PCT/NO94/00113. However, the new invention described herein makes use of two very important modifications: It utilises an entirely different system for position definition and control signal generation, and it exploits fully all possible control modes inherent in the handle and plate configuration, making it ideal for e.g. object control in three dimensions.

Instead of having detector systems create a pulse-train or a variable analog signal based upon movement, position change or force, the present invention utilises a system for address-reading for exactly and unambiguously defining the position of the device's control members. In order to achieve this, the device utilises one or several reference planes, relative to which the control members' positions are defined. A prerequisite for this exact position definition, is that the reference planes are equipped with arrays of electronically addressable elements, or that each of these elements carries position information that can be read by a proper device. This is obtained in several ways, as described below for the various embodiments of the invention.

The technologically simplest, and thus preferred class of embodiments utilises an array of light detecting units (photodiode arrays, charge-coupled devices, active pixel sensors, etc.) laid out on the surface of a reference plane, where each unit's position is identifiable, e.g. when hit by an incident laser beam. In another class of embodiments the surface of the reference planes are sub-divided into pixels carrying imprinted, engraved or magneto-polarised address information in digitised form. This address is read by means of a laser beam or another form of directed, condensed light or electromagnetic radiation. For simplicity, the term laser beam or light beam is used hereinafter to encompass all said forms of radiation.

Pixel addresses on the surface of reference planes are employed both for congruent movement control and to define vectors used as basis for continuous, directed object or cursor movements.

Whenever a control member change position relative to a reference plane, this movement is accompanied by a change of position of a laser beam striking said reference plane. Consequently, new light-sensitive units on the plane surface are being hit by the beam, or new pixel addresses are read from the reflected beam. Since each light-sensitive unit and each pixel has a unique address, this change of spatial orientation of the control members can be exactly defined, and the change of addresses can subsequently be used to induce a position change or a continuous, directed movement of objects that are subject to control, being it a screen cursor or a physical object. This is achieved by having a microprocessor transform change of addresses or vectors into pulse trains that define translocations in the objects' space, or by having a device driver interpret and transform address information directly. Techniques for handling address information associated with the device's control modes and making it usable for object control will be familiar to persons skilled in the art.

The employment of specific address information for defining the spatial orientation of control members has several advantages over other systems. A certain position change need only be defined by the start and final addresses if the intermediary postitions are insignificant. However, if the track itself is important, the fine structure of the movement path can be determined by adjusting the frequency of address determination. The more frequent the address sampling, the higher the sensitivity and precision of the device operation. The sensitivity and precision of object control can thus be adjusted according to needs by adjusting the address sampling frequency. For this reason, it is also possible to increase the precision of object control by slowing down the speed of operation of the control members, this in contrast to systems where signal generation is associated with device movement.

The described address-reading system can be used both for instigating a congruent movement of an object in response to a device movement (mouse operation), and to induce a continuous, vectorial movement (joystick operation). The latter is achieved by having control members' position addresses describe vectors, where the 'normal' or relaxed position defines the start, and any off-set from this normal position defines the end of the vector. Thus, the direction and magnitude of the vector are defined by two sets of addresses.

The device may also incorporate provisions for interpreting position changes of a control member differently, depending upon the degree of off-set from its normal position. A position change near the outer limit of its mobility range may e.g. instigate a more extensive movement of the object than changes near the control members' normal position.

The described principle, where the point of impact of a laser beam upon one or more reference planes is used to define the spatial orientation of control members, can be implemented technologically in basically four different ways:

First class: Employing reference planes equipped with light-detecting units (sensor array), each unit having a specific address. A device part responsible for directing laser beams towards each reference plane (encompassing laser, mirrors, lenses, focusing coils, etc.; hereinafter referred to as the beam director) is linked to the control member. A change of spatial orientation of the control member will alter the orientation of the beam director and its associated beam(s), and consequently the beam's point of impact on the reference plane. One reference plane is sufficient for defining the position of a multitude of control members, provided that the different beams can be identified as being associated with certain specific control members. This can be achieved either by relative position determination or by employing a system of sequential light emission from the different beam directors.

Second class: Employing reference planes equipped with light-detecting units. The paths of the laser beams are fixed relative to the device, while the reference planes are linked to, or otherwise arranged such that a movement of the control members will change the position of the reference planes relative to the incident laser beams. A change of spatial orientation of a control member will consequently alter the beam's point of impact. This technical solution requires the use of several reference planes, depending upon the number of control modes employed.

Third class: Employing reference planes with address-carrying pixels. Beam directors are linked to the control members. A change of spatial orientation of a certain control member will alter the orientation of the beam director and its associated beam(s), and consequently the beam's point of reflection from the reference plane. One reference plane is sufficient for position definition of a multitude of control members and their associated laser beams, provided that the different beam reflections can be identified as being associated with certain control members. The device also incorporates utilities for analysing beam reflections, e.g. single sensors associated with scanning devices, or sensor arrays.

Fourth class: Employing reference planes with address-carrying pixels. The paths of the laser beams are fixed relative to the device, while the reference planes are linked to, or otherwise arranged such that a movement of the control members will change the position of the reference planes relative to the incident laser beams. This technical solution requires the use of several reference planes, depending upon the number of control modes employed. The device also incorporates utilities for analysing beam reflections, e.g. single sensors associated with scanning devices, or sensor arrays.

The plate-and-grip configuration employed as control elements by the present invention has the potential of incorporating five control modes. These five modes are the following:

1. Movement of the plate support in all directions in an X-Y plane (mouse operation);
2. Pivotal movement of the handle relative to the plate support (joy-stick operation);
3. Lateral movement of the handle relative to the plate support;
4. Vertical movement of the handle relative to the plate support;
5. Rotational movement of handle relative to the plate support.

The mouse and the joy-stick are only utilising one of the described control modes for motion and position control, while PCT/NO94/00113 utilises two (1 and 2). However, the present invention can potentially utilise all five control modes simultaneously, and does therefore provide the capability of extensive control of objects in three dimensions: Mode 1 and 4 (and optionally 2 or 3) can be used for positioning of the object centre, 2 and 5 for rotation, and 3 for scrolling or transposition of the reference frame. A more detailed description of the device's parts and operation is given below.

According to the present invention there is provided an object control device comprising a finger- or hand-grippable member which is mounted on top of a plate support, the grip and plate together constituting the central control elements of the device. The grippable member has cylindrical shape with a diameter of b 3–50mm and a height of 5–150 mm, preferably sculptured and coated with a suitable material for maximum handling comfort.

The plate support is restricted in its movements to within a delimited area of a plane equivalent to a circle of diameter 5–100 mm; the area itself can have an arbitrary form, but the form is preferably circular. The plate support is defined to be in its 'normal' position when the grippable member is located at centre of the delimited area. The grippable member is resiliently mounted to the plate support, permitting a simultaneous movement of the two control elements relative to stationary parts of the device, and at the same time allowing the grippable member to be moved relative to the plate support. Flexible collars, springs, pneumatic devices, etc. will automatically bring the grippable member back to a normal, preferred position relative to the plate support when not subjected to a directed force. It may also incorporate provisions that make the user sense when the grippable member attains its normal position, and utilities for preventing the grippable member induce object movement until the degree of off-set from said normal position has passed a threshold value.

The five control modes described above are utilised as follows:

1. Movement of the plate support relative to a stationary part of device is used for exact positioning and motion control of an object in the X-Y plane. The movement patterns of the support plate and the object are generally congruent;
2. Bending of the grippable member in any direction relative to the plate support is used to elicit a continuous movement and to control the speed and direction of movement of an object in the X-Y plane; or alternatively, to induce and control the rotation of an object around an axis in the X-Y plane. The bending direction and inclination angle of the member relative to a normal position will determine the direction and speed of object movement or direction and speed of rotation;
3. Lateral movement of the grippable member in any direction relative to the plate support is used to elicit a continuous movement and to control the speed and direction of movement of an object in the X-Y plane; or alternatively, being used for scrolling purposes whereby the frame of reference is transposed. The direction and the degree of off-set from a normal position will determine the direction and speed of object movement or direction and speed of scrolling;

4. Lifting depressing the grippable member relative to the plate support is used to control the movement of an object along the Z-axis in a three-dimensional co-ordinate system, whereby the direction and degree of off-set from a normal position control the speed of movement in either direction along the Z-axis. Lifting depressing the grippable member may also be employed for switching purposes using three or four switch positions;

5. Rotation of the grippable member clockwise or anti-clockwise relative to the plate support is used to rotate an object around the Z-axis. The device is constructed to allow one out of two possible modes of operation: 1) In the first mode a normal position is defined, and clock-wise or counterclock-wise rotation is limited to within a certain sector; the direction and degree of off-set from the normal position defines the direction and speed of rotation; or 2) in the second mode the handle is enabled to rotate without limitations, and a rotation of the handle is accompanied by a congruent rotation of the object.

The described control modes can be put together in any combination according to specific needs. The control modes can be utilised simultaneously and independently, although the lateral movement of the grippable member relative to the plate support is preferably executed while being pushed towards the outer edge of its mobility area.

Preferred embodiments will now be described, by way of example only, with reference to the accompanying drawings, wherein.

Figure 1:
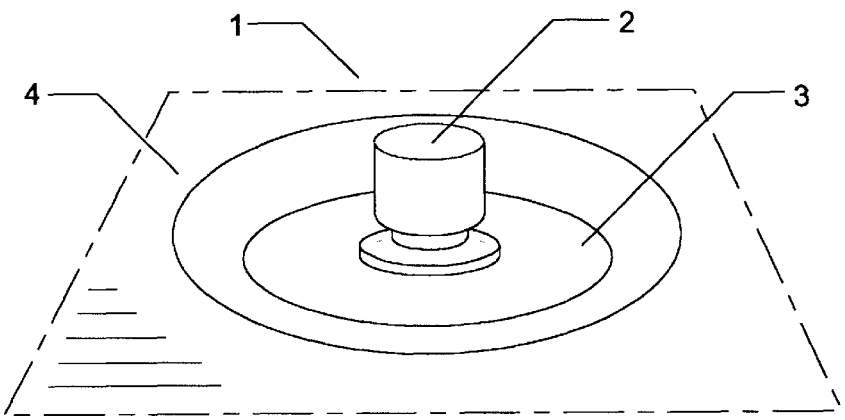
FIG. 1 shows a perspective view of the control device as incorporated in a computer chassis.
Figure 2:
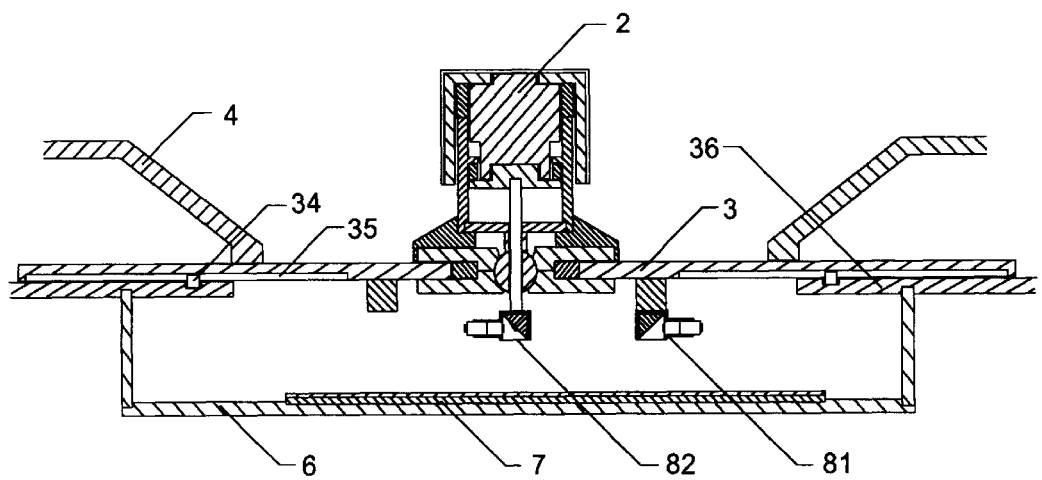
FIG. 2 shows a vertical cross-section of the control device according to a preferred embodiment of the present invention.
Figure 16A:
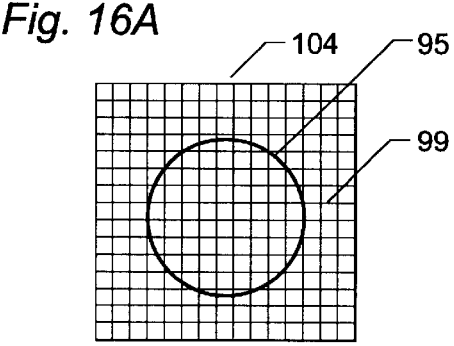
Figure 16B:
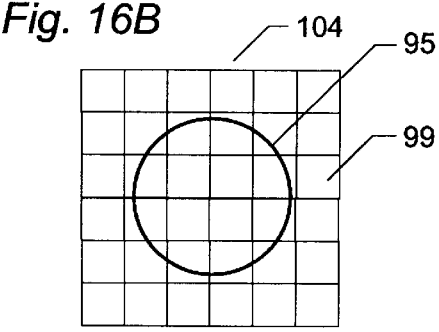
Figure 17:
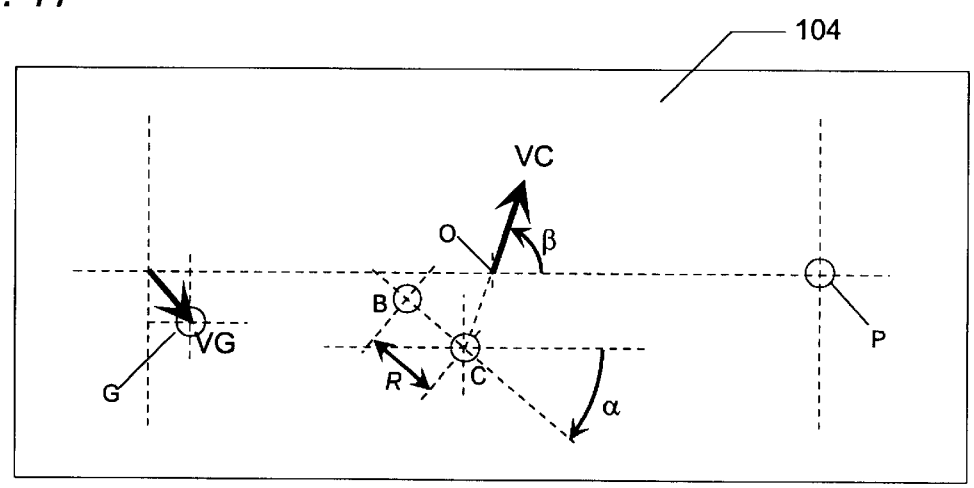
Figure 18A:
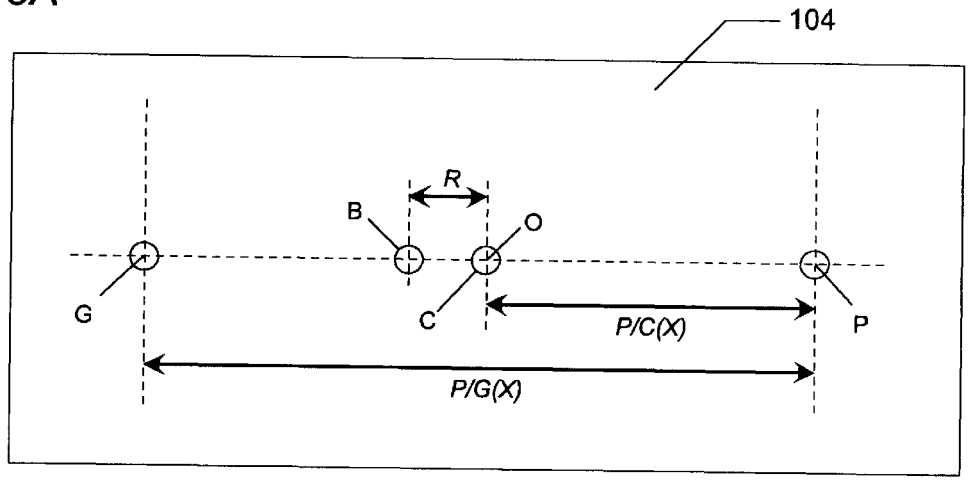
Figure 18B:
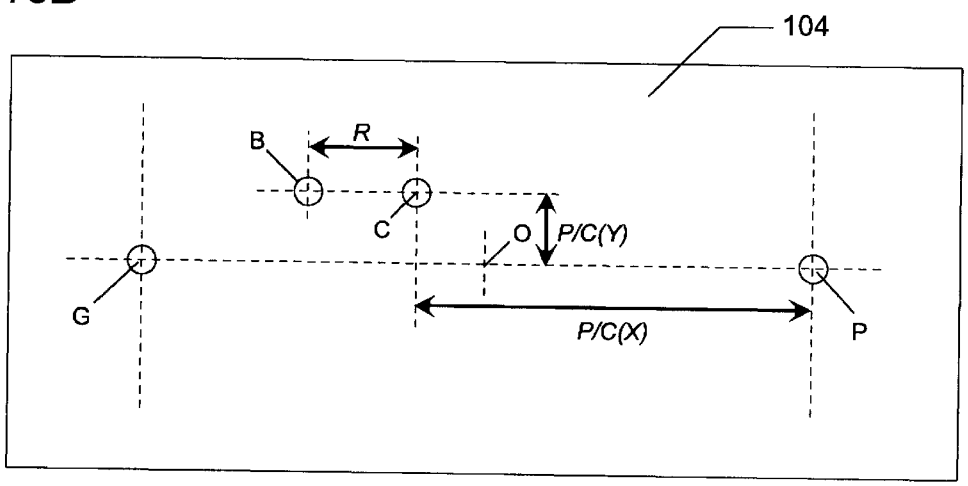
Figure 18C:
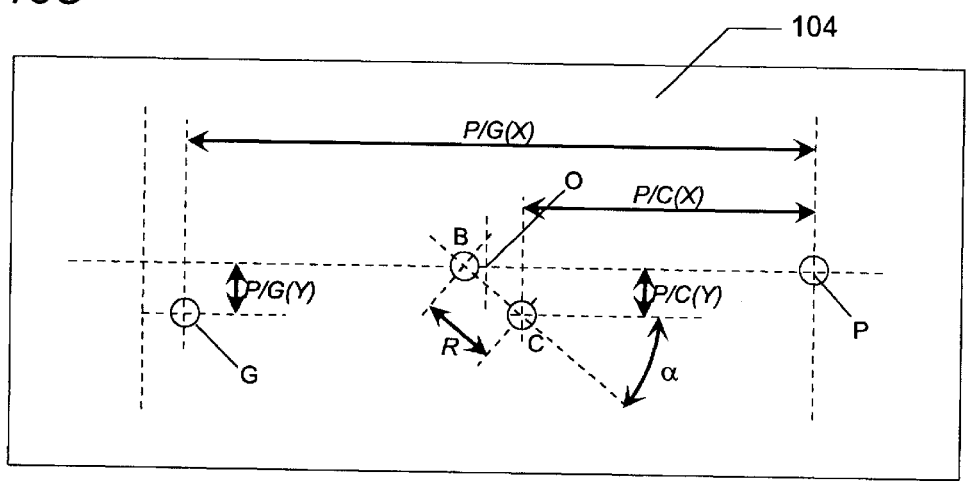
Figure 20:
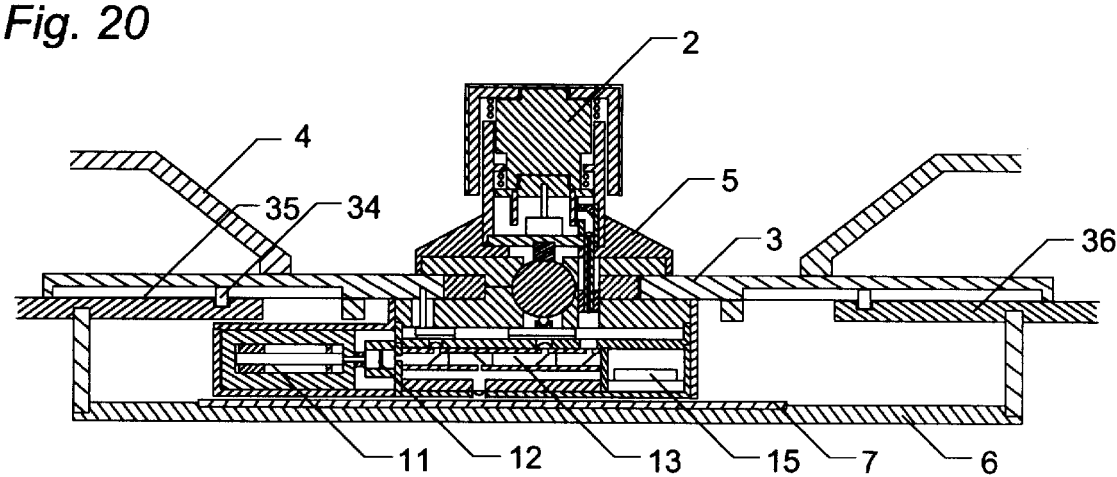
Figure 21:
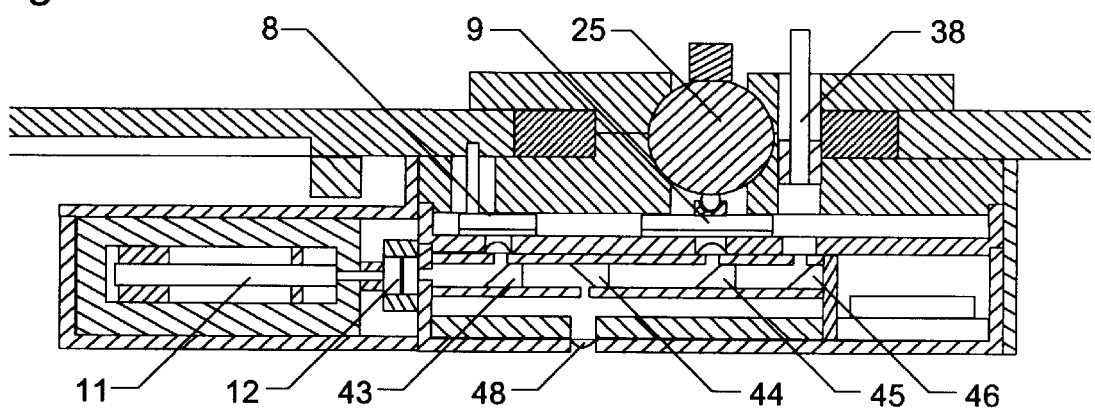
Figure 22:
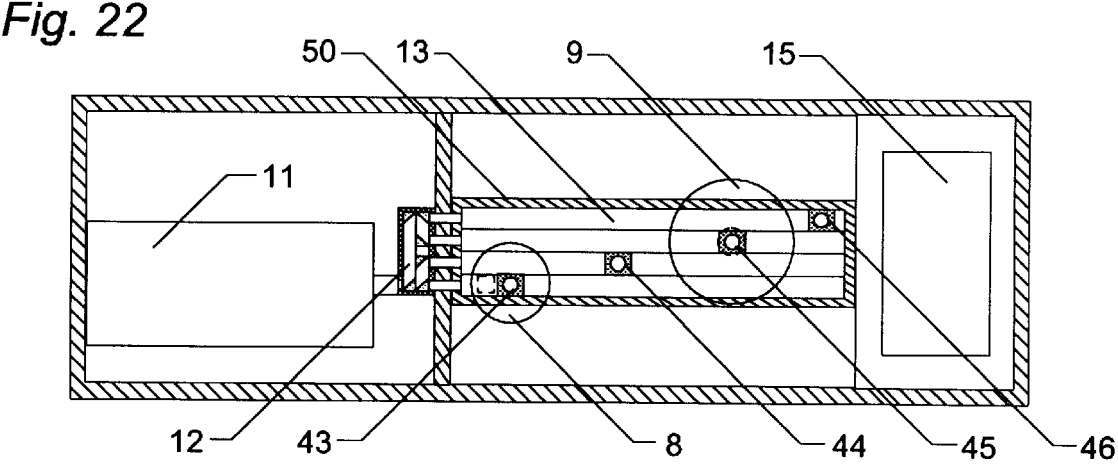
Figure 23:
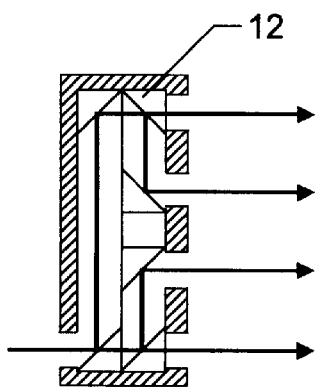
Figure 24:
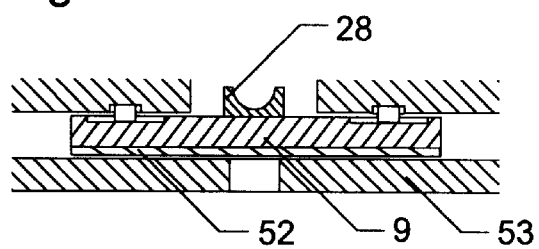
Figure 25:
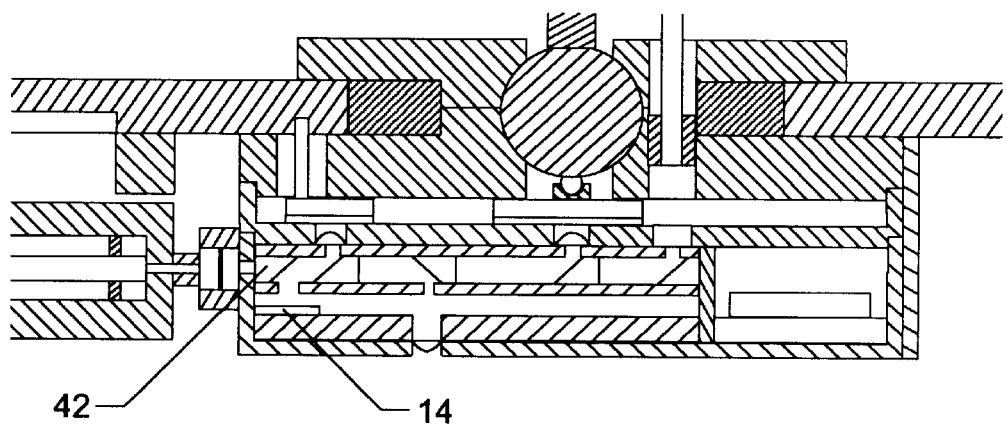
Figure 26:
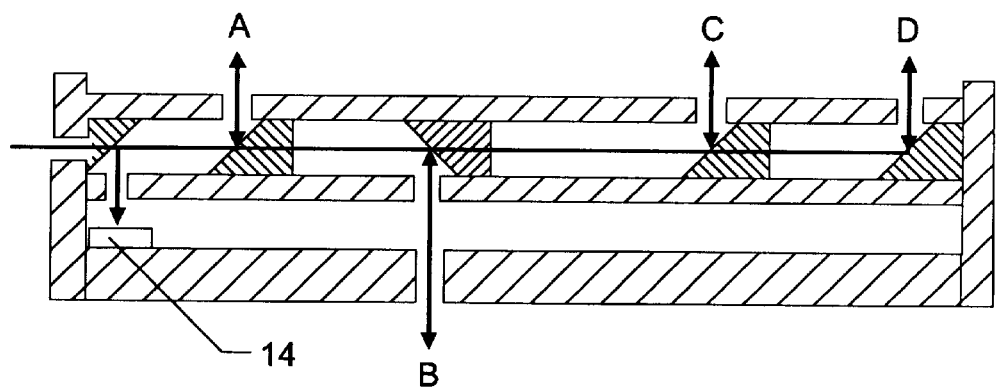
Figure 27:
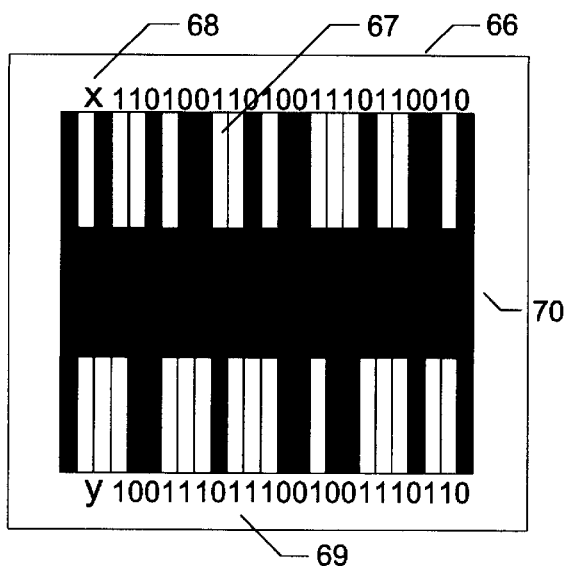
Figure 28:
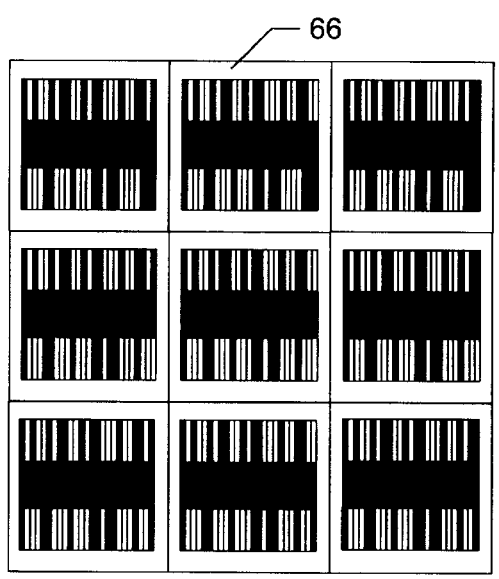
Figure 29:
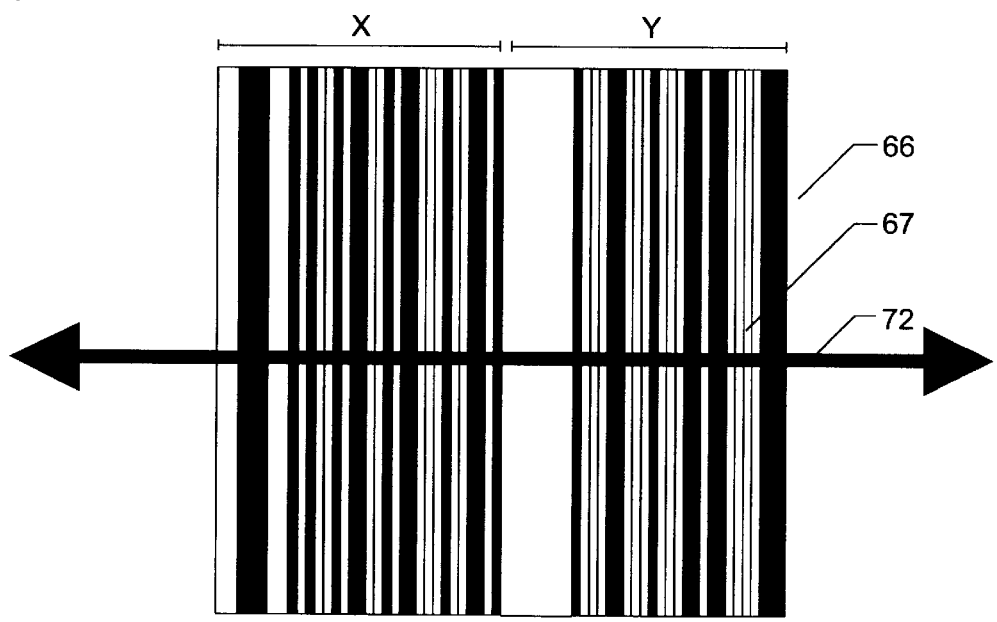
Figure 30:
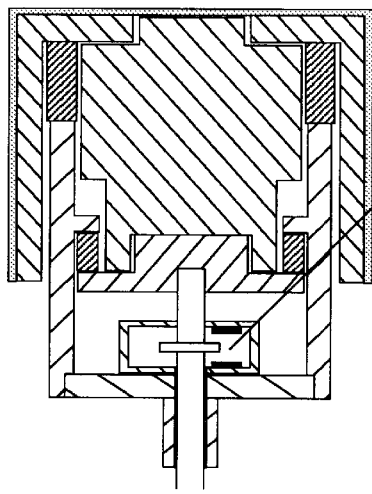
Figure 31:
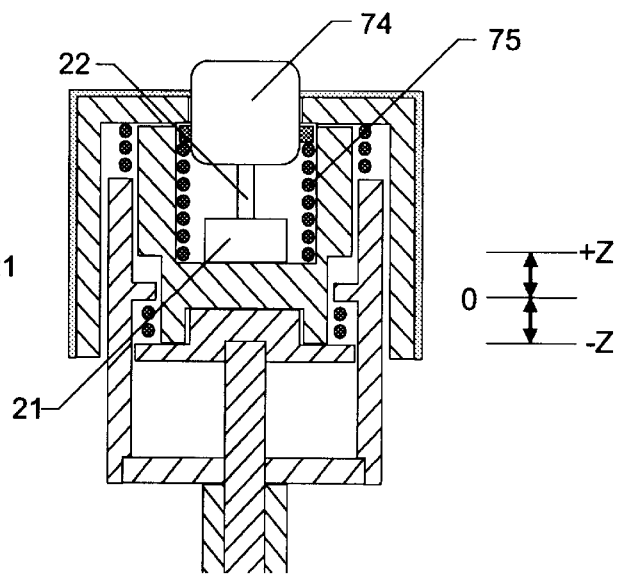
Figure 32:
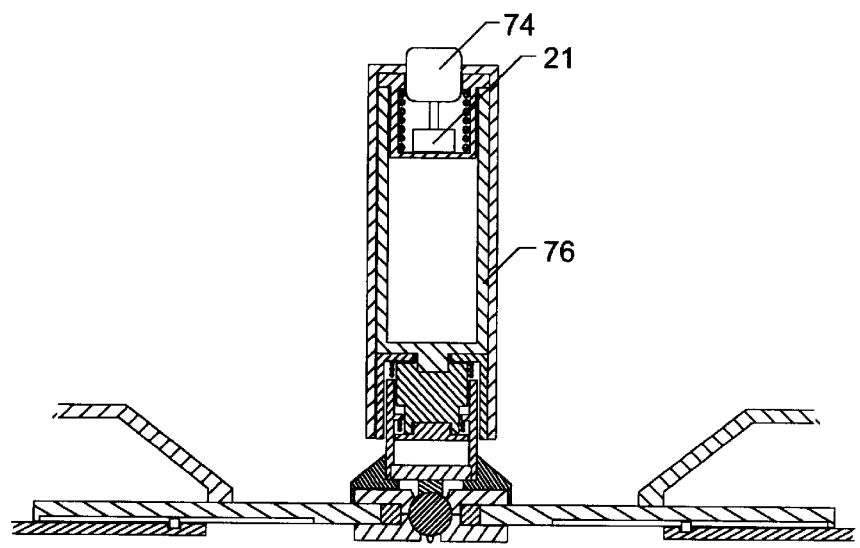
Figure 33A:
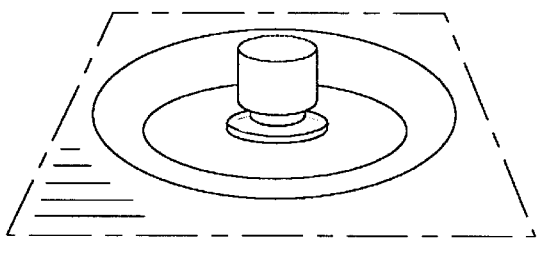
Figure 33A:
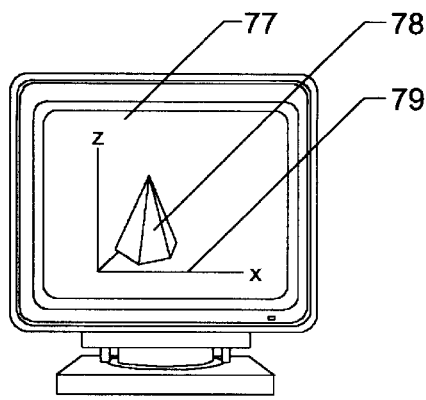
Figure 33B:
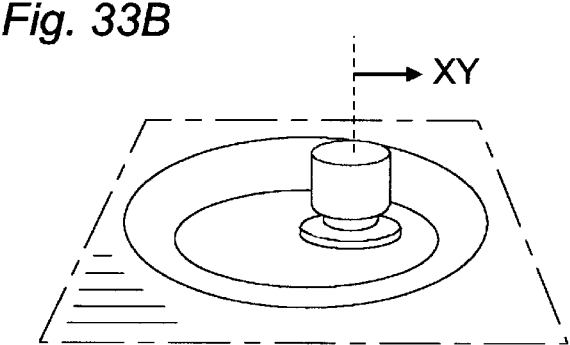
Figure 33B:
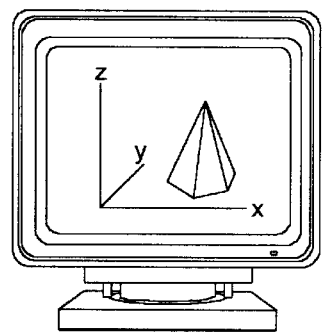
Figure 33C:
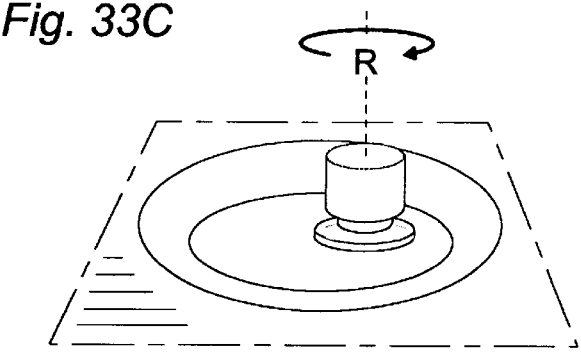
Figure 33C:
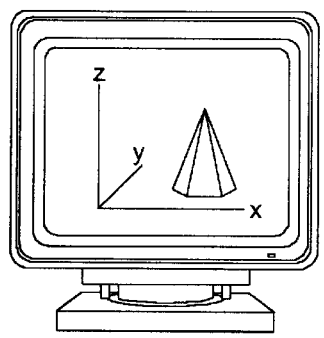
Figure 33D:
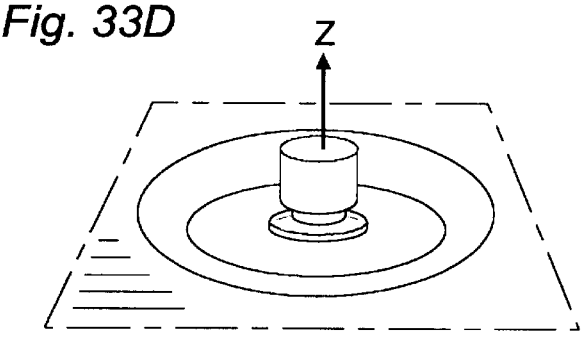
Figure 33D:
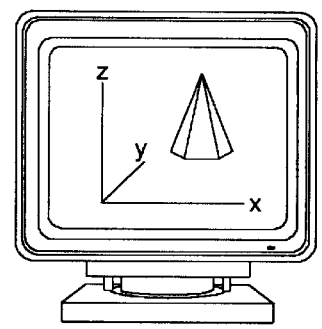
Figure 33E:
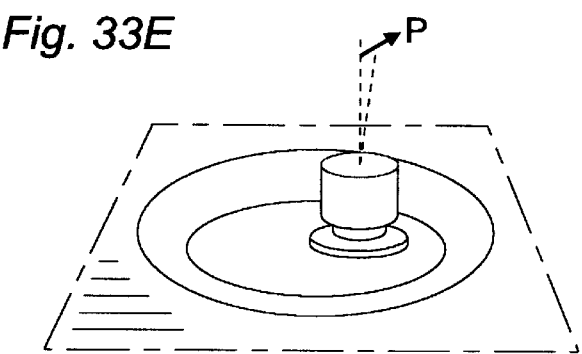
Figure 33E:
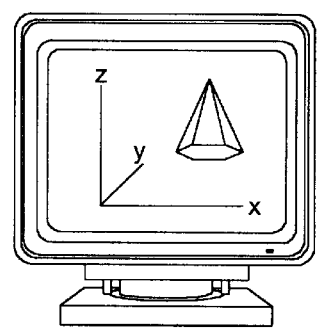
Figure 33F:
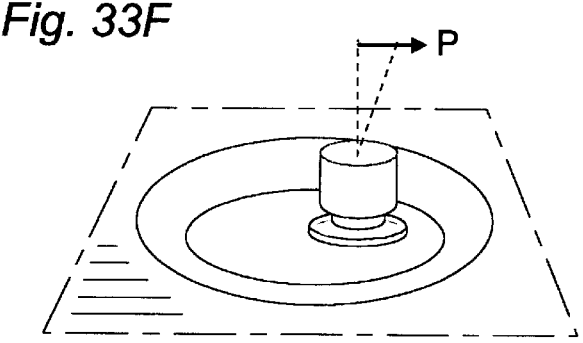
Figure 33F:
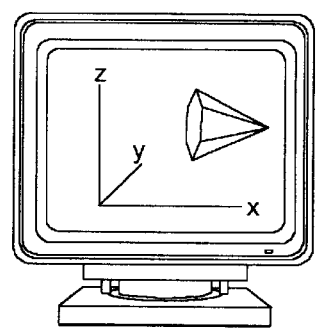
Figure 33G:
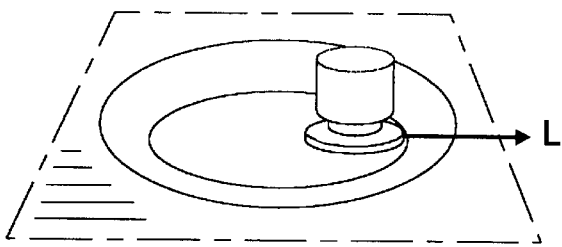
Figure 33G:
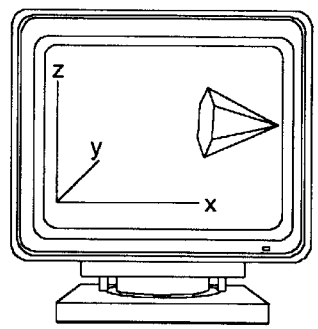

FIGS. 13A–C, 14A–C and 15A–C illustrate the effect of manipulating the finger grip on beam paths and light spots (beam impact spots);

FIGS. 16A and 16B show the outline of a beam when striking two sensor arrays with different pixel size;

FIG. 17 illustrates the use of beam impact spots for computing vectors and other key parameters employed for cursor and object control;

FIGS. 18A–C show beam impact spots and key distances used for computing and assessing positions and spatial orientations of control members;

FIGS. 19A–H show alternative beam patterns and beam shapes used for defining spatial orientation of the finger grip;

FIG. 20 is a vertical cross-section of the control device according to a second class of embodiments of the invention;

FIG. 21 is a detailed view of a vertical cross-section of the detector part of the device;

FIG. 22 is a top view of the laser source and the beam-guiding part of the device;

FIG. 23 is a detailed view of the beam splitter, showing light paths;

FIG. 24 shows a vertical cross-section of the plate serving as reference plane for pivotal movement of the finger-grip;

FIG. 25 is a vertical cross-section of the control device according to a third class of embodiments of the invention;

FIG. 26 shows the light paths through the beam guiding part of the device;

FIG. 27 is a conceptual representation of an address-carrying pixel;

FIG. 28 illustrates an array of pixels;

FIG. 29 illustrates a pixel with a linear address-arrangement;

FIG. 30 shows a vertical cross-section of the finger-grip, incorporating a micro-switch connected to the piston;

FIG. 31 shows a vertical cross-section of the finger-grip, incorporating a finger-operable switch;

FIG. 32 shows a vertical cross-section of an embodiment of the control device where a hand-grip is used as a control member;

FIGS. 33A–G illustrate the different modes of operation of the device.

more detailed description of the various parts of the device and different embodiments are given in the following:

FIGS. 1 and 2 and illustrate the main components of the control device 1 in accordance with a preferred embodiment of the invention, consisting of a finger-grip 2 and a circular plate support 3 incorporated in a computer or device chassis 4. The diameter of the visible part of the support plate 3, which is approximately equal to the mobility range of the finger-grip, should be between 0.5 cm and 10 cm and is typically between 1 cm and 4 cm. Other embodiments of the invention may utilise other technical solutions where the plate support is partly or totally obscured, and where the relationship between the mobility range and the visible part of the plate is different from the one described.

Figure 3:
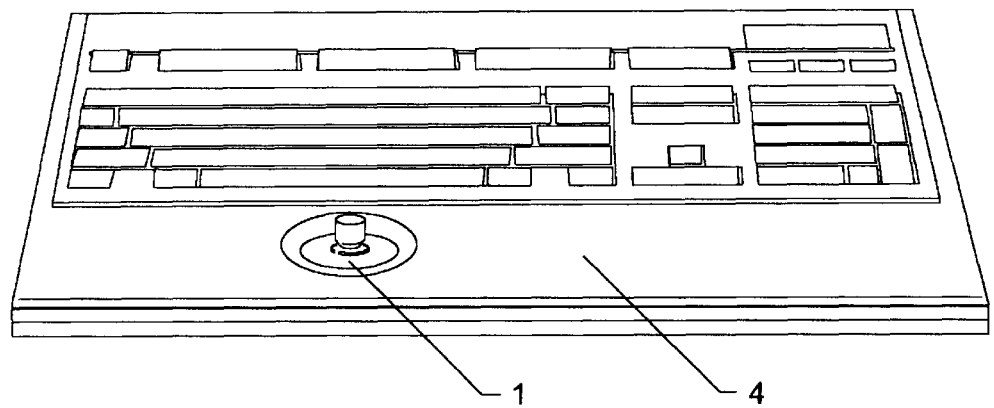
FIG. 3 shows the control device incorporated in a computer keyboard.
Figure 4:
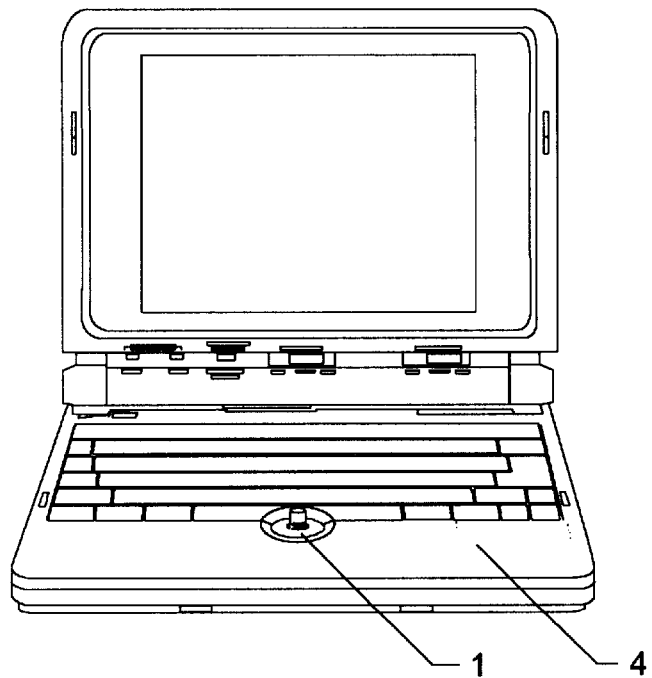
FIG. 4 shows the control device incorporated in a laptop computer.

The control device is located in a recess in a keyboard (FIG. 3) or a computer top (FIG. 4) which has sloping walls giving room to grip the handle 2 and move it in all directions. A guide plate 36 (FIG. 2) together with the recess 4, creates a slot for permitting a guided, horizontal movement of the plate support 3.

The finger-grip is resiliently mounted to the plate support using a particular attachment system enabling the grip to be moved in all directions relative to the plate, which, together with a flexible collar 5 (FIG. 5)ensures that the finger-grip returns to a normal position after an off-set in any direction. Other attachment systems may be used to obtain the same effect.

When in use, the finger grip is held between the thumb and the index finger, or the tip of the finger may rest on top of the grip. An horizontal movement of the hand and finger(s) will cause a corresponding movement of the plate support.

As shown in FIG. 2, laser beams are generated and emitted from two beam-directing members (beam directors), 81 and 82, being aimed at the reference plane 7. (It should be noted that by using optical fibres, the laser itself may be localised elsewhere within the computer chassis). The reference plane contains on its surface an array of light-detecting units, providing an output signal that enables an analyser to determine the exact position of impact of the laser beams.

The beam director 81 is attached to the plate support, and the path described by the beam's impact spot on the reference plane will thus be congruent with the movement path of the plate support itself.

The beam director 82 is connected to the finger grip 2, and can thus be given a pivotal and a lateral movement relative to the plate support. Since the director 82 is connected to the cap of the finger-grip via a slideable piston, it can also be rotated and moved vertically by manipulating said cap.

In the present embodiment two laser beams are used to describe the spatial orientation of the finger-grip. These beams may stem from one source, utilising a beam splitter (see FIGS. 7 and 8), or alternatively by employing two separate laser sources.

The plate support incorporates a movement direction guide that will prevent the plate from being rotated. In this particular embodiment, the guide comprises two slots 35 located in the plate support, and two similar slots in the plate guide 36; the two pairs of slots being positioned at right angles to each other, and with two guide members 34 resting in both slots. Other guide principles may also be employed, and will be familiar to persons skilled in the art.

Figure 5:
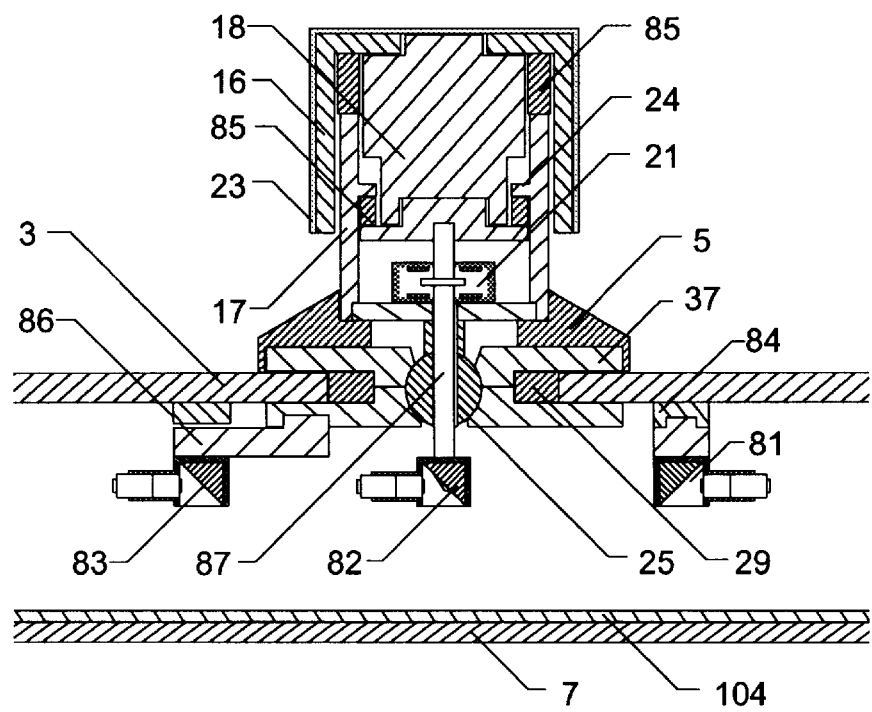
FIG. 5 shows a vertical cross-section of the finger grip and laser beam directing parts (beam directors)

FIG. 5 gives a more detailed description of the finger grip 2 and beam directors 81, 82 and 83. The finger grip consists of an outer cap 16, covered with a rubber-like material 23 for maximum handling comfort. The inner part of the finger grip consists of a piston 18 which is attached to the cap, and which can be moved vertically within a cylinder 17. The cylinder is equipped with a lip or protrusion 24 that limits the vertical movement of the piston. The cap can be pushed and pulled vertically, and will return to a "normal" position by means of two flexible rings 85 made of a durable, resilient material that will retain its original shape after deformation, or alternatively by springs or pneumatic devices. The beam director 82 is connected to the piston 18 via a smaller-diameter piston 87. The piston 87 can be slid up and down and rotated in a bore in the centre of the ball-hinge 25, and can thus convey to the light-directing part vertical and rotational movements of the grip's cap. The ball-hinge further allows the finger-grip to be moved pivotally relative to the plate support, and at the same time providing a firm attachment of the finger-grip to the plate via a set of clamps 37. The finger-grip is further provided with a flexible collar 5 made of a durable, resilient material that will allow a certain degree of bending, but will re-locate the grip to a normal position after relaxation of the applied force. A bending of the finger-grip will thus cause beam(s) emitted from the beam director 82 to change direction. Beam director 81 is used for position determination of the plate support. This embodiment employs a third beam director 83 which is used for detecting lateral movement of the finger grip relative to the plate support. The beam director is directly attached to the clamps 37, and will not move relative to director 81 unless the grip and clamps change position relative to the plate support. This position change is allowed due to the presence of a flexible ring 29 positioned between the plate and the clamps, making the clamps and finger grip return to a normal position after the lateral force is relaxed.

This lateral movement can be instigated by e.g. arresting the plate with one finger, and pushing the flexible collar 5 sideways with another finger. Preferably, this movement is accomplished when the plate and grip is positioned at the edge of their mobility range where a ring-formed stopper 84 prevents further outward movement, at which time the collar and finger grip can be pushed further outwards in a particular direction.

By using a resilient ring-formed stopper (84), the plate support may be forcibly displaced beyond its natural mobility range in any horizontal direction. Provided that addresses outside the normal, non-restricted range represent vectors instead of positions, this option is equivalent to the use of a lateral movement of the finger grip relative to the plate support as control mode.

Figure 6:
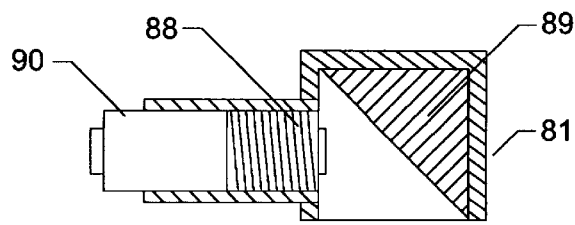
FIG. 6 shows a vertical cross-section of a beam director incorporating a laser.
Figure 7:
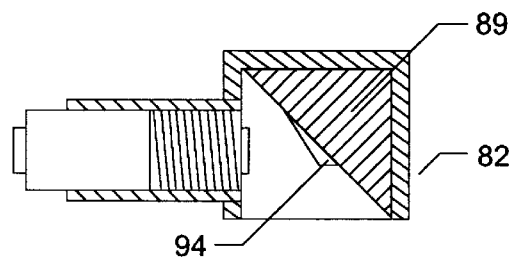
FIG. 7 shows a vertical cross-section of a beam director incorporating a laser and a beam splitter.

FIGS. 6 and 7 illustrate two beam directors, incorporating different combinations of lasers, focusing coils and reflectors that are employed in order to obtain the desired convergence, divergence, directioning and splitting of beams according to present needs. (The depicted lasers 90, focusing coils 88, reflectors 89 and beam splitters 94 are not neccessarily drawn according to actual proportions, but are merely acting as symbols to indicate their use in certain device members). Lenses, focusing coils, mirrors and other beam-modifying members may also substitute each other, without this being specifically indicated in the actual description. Such modifications and specific requirements will be familiar to persons skilled in the art.

Figure 8:
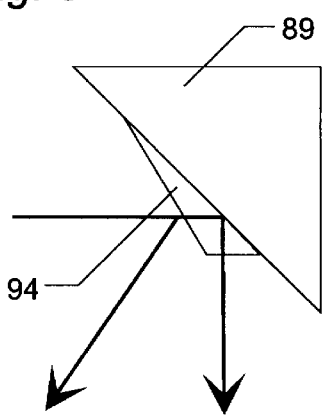
FIG. 8 shows a detailed wiew of the beam splitter, indicating the beam paths.

The beam director illustrated in FIG. 6 incorporates a laser 90 and a focusing coil 88 used for narrowing and directing the laser beam via the reflecting mirror 89 towards the reference plane. In FIG. 7, the coil is directing the beam towards a beam splitter 94 with a semi-penetrable, half-silvered surface. This arrangement will create two, diverging beams as shown in FIG. 8.

Figure 9:
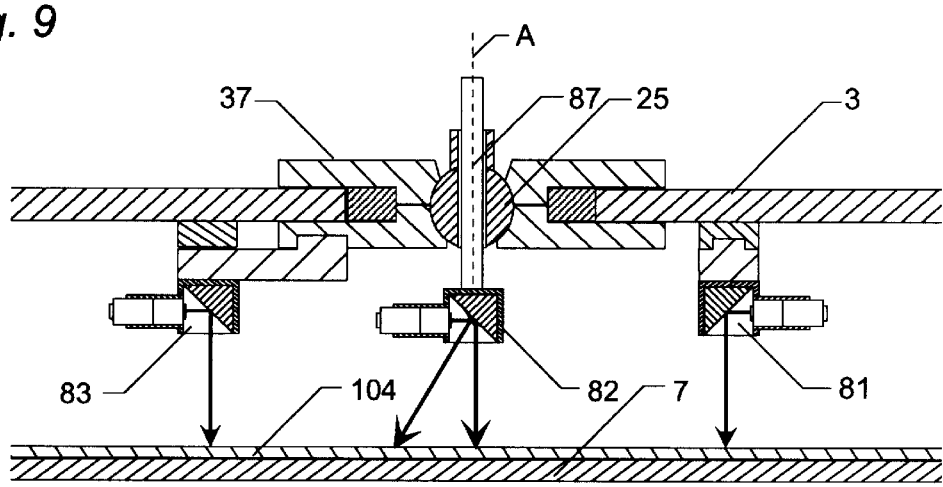
FIG. 9 shows a vertical cross-section of part of the control members, including three beam directors with indications of beam paths from each director.
Figure 10:
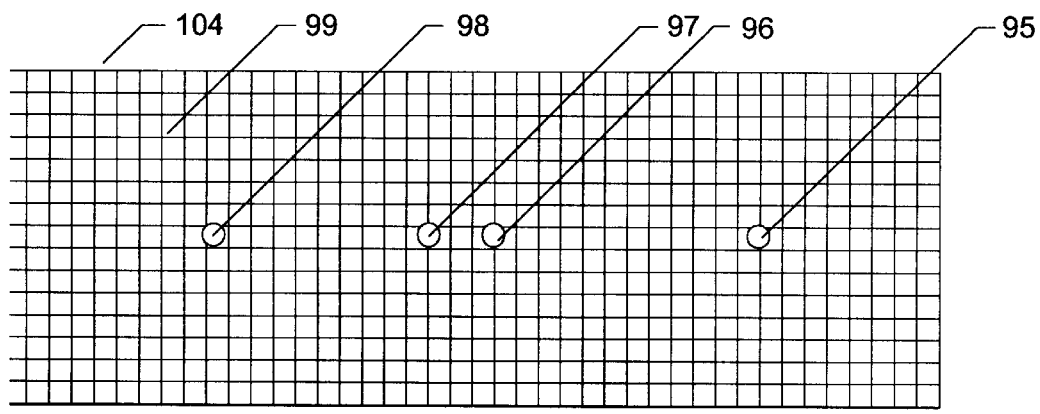
FIG. 10 shows the surface of the reference plane, with circles indicating the spots where beams strike the surface.

The result of using two different beam directors as described above is shown in FIG. 9. The beam directors 81 and 83 will aim single beams of light at right angles relative to the sensor array 104, while director 82 will produce two beams, one diverging from, and the other following the central axis A towards the reference plane 7. The resulting pattern of light spots occurring when the beams from the three directors hit the sensor array 104 with its individual light-detecting units 99 is shown in FIG. 10. Spot 95 stems from the plate-connected director, spot 98 from the grip clamps-connected director, and spots 96 and 97 stem from the grip piston-connected director.

Figure 11:
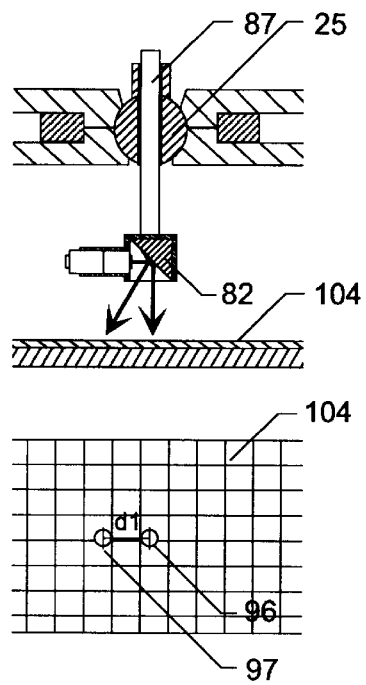
FIG. 11 shows the grippable member in a normal position.
Figure 12:
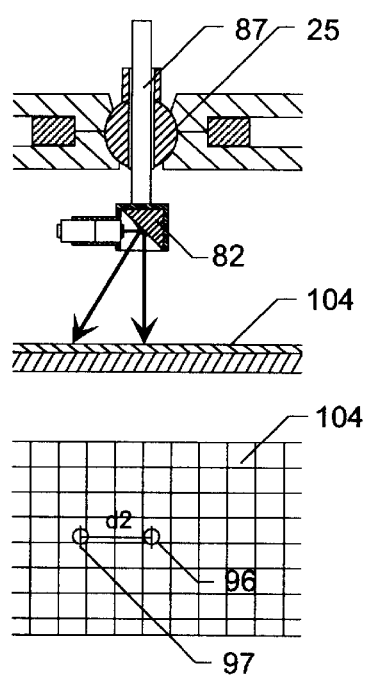
FIG. 12 shows the effect on beam paths of pulling the grippable member upwards.

The distance between the impact spots where the two beams from director 82 strike the reference plane will be dependent upon the beam director's distance from the plane. This effect is utilised for determining the vertical position of the finger grip relative to the reference plane, as illustrated in FIGS. 11 and 12. Here, the distance d1 between the impact spots 96 and 97 is increased to d2 after the grip is retracted, causing the piston 87 to move the beam director away from the sensor array 104.

Figure 13A:
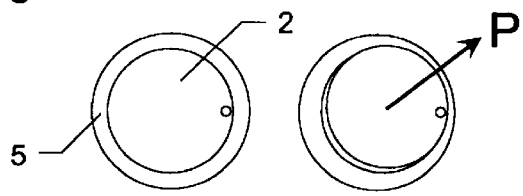
Figure 13B:
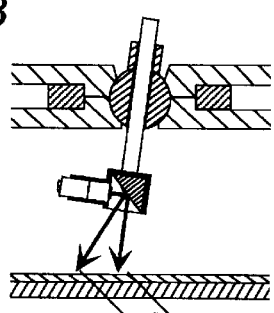
Figure 13C:
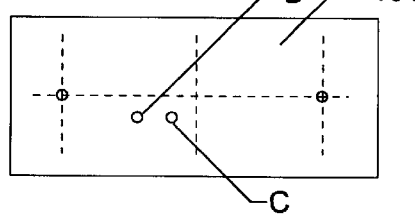

The use of different control modes are illustrated in FIGS. 13, 14 and 15, where FIGS. 13A–C show the effect of lifting and bending the finger-grip 2 in a direction of P. The effect on the beams is shown in FIG. 13B, where the distance between B and C is slightly increased compared to a situation when being lifted vertically, due to the bending. This effect is taken care of by trigonometric computations, and is part of the position calculation performed by the control device's associated analyser/processor or by the device driver.

Figure 14A:
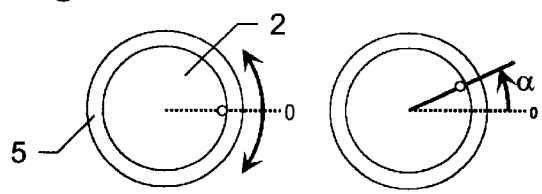
Figure 14B:
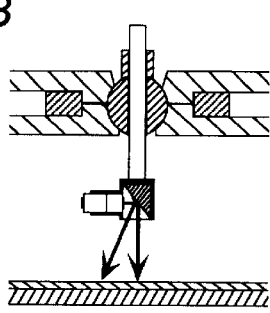
Figure 14C:
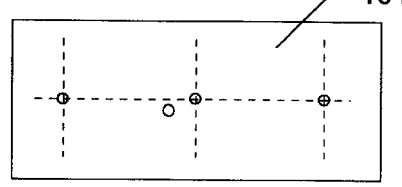

FIGS. 14A–C illustrate the effect of rotating the finger grip an angle α counterclock-wise (approx. thirty degrees), while the grip otherwise attains a normal position.

Figure 15A:
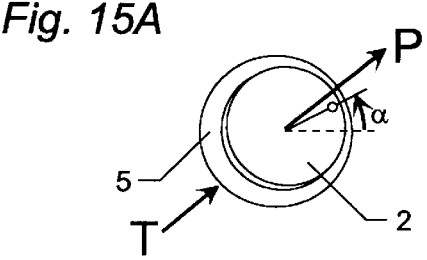
Figure 15B:
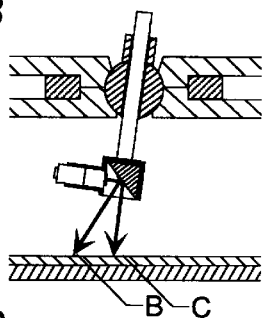
Figure 15C:
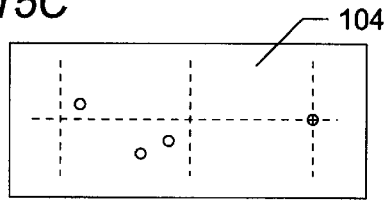

FIGS. 15A–C illustrate a composite-manipulation of the finger grip, utilising three different control modes. The grip is bent towards P, rotated an angle α counterclock-wise, and pushed laterally in the direction of T.

FIGS. 16A and 16B illustrate that the size of the light-detecting units 99 relative to the size of the beam impact spot 95 will affect the precision of the position determination, provided that the illumination of the individual units gives 1 (one) or 0 (zero) as result when compared to a treshold value.

FIG. 17 summarises how address information associated with different control modes are used to control cursor or object movement. In general, the P-address is used to determine the object's position in an X-Y plane; i.e. a shift of address signifying a position change of the plate support will cause a similar position change of the object. Plate movement and object movement will normally be congruent.

The C-address describes the inclination angle and the bending direction of the finger grip. The inclination angle defines the magnitude of a vector VC, which in size is equal to the length of line OC but points in an opposite direction from O. The line OC also defines the bending direction β of the finger grip, being equal to ∠POC−180°. The magnitude of VC and β are key parameters used for controlling the speed and direction of movement of an object, either around an axis or laterally in an X-Y plane. It should be noted that if G is moved from its normal position, C will move in an identical manner and the C-address will have to be corrected accordingly in all computations.

The B-address describes, together with C the rotation and elevation of the finger-grip. The rotation is determined by the angle α, equal to the angle between the lines PO and CB. The finger-grip's off-set from the "mid" (normal) position is described by R, being equal to the distance BC. By using trigonometric computations, a normal R value corresponding to the grip's mid position can be determined for every inclination angle and grip rotation, and any deviation from this normal value signifies and quantifies an off-set in −Z or +Z direction. The α parameter will normally be used for controlling the speed and direction of rotation of an object around a Z-axis, but can optionally be used to define the rotational position of same object, and to control rotation in a congruent manner. The R parameter is used to control speed and direction of movement along the Z-axis.

The G-address signifies a lateral movement of the grip and its associated clamps relative to the plate support. The magnitude and direction of the vector VG is defined by the "normal" address (which is determined relative to P) and the off-set address. The VG parameter is used to control a continuous movement in an X-Y plane, or may be used for scrolling purposes. The direction and speed is determined by VG's direction and size.

Neighbouring addresses will normally be equidistant in every part of the reference plane(s) and evoke a uniform response irrespective of control member position. However, the use of position addresses gives the extra benefit of assigning e.g. addresses near the border of the control members' mobility range different values and functions. For example may bordering addresses be used to define vectors (as basis for continuous, directed movement), while addresses within these borders have values and functions that will elicit a congruent movement of objects in response to control member movement. By modifying the address usage in this manner, it is possible to further extend the control potential of the device.

As support for the above computations, the device incorporates utilities or utilises software for determining geometric parameters that describe shapes or patterns formed by laser beams when hitting the reference planes, such as area, position of geometric centre, axis lengths, radii, focal points, distance from a plane's origin, rotation angle, angle and direction of impact etc., based upon output from the individual light-detectors.

The same general principles also apply for other embodiments, although several reference planes may be needed, and each control mode may employ a different number of laser beams for position identification.

FIGS. 18A–C illustrate the effect of utilising the different control modes on the pattern of light spots created by beams from the three directors 81, 82 and 83. FIG. 18A shows a "normal" situation, where the plate 3 is located in an arbitrary position in the X-Y plane as defined by its associated beam impact spot P. The position of the other impact spots C, B and G are described, both by their absolute addresses and their positions relative to the reference address P. In this illustration, their relative positions are described by P/C(X), P/G(X) and R. The impact spot C coincides with the point O where the grip/director's central axis A cross the reference plane when the finger-grip is located in its "normal" position.

In FIG. 18B, the grippable member is lifted, increasing the diameter R between B and C, and at the same time the member is bent towards 4.30 (clock position), directing the beam in the opposite direction towards 10.30. Based upon the detected beam impact addresses P, B, C and G, the parameters P/C(X), P/C(Y) and R can be easily calculated by the analyser, and also derived information such as the vector OC describing the grip's inclination angle and exact bending direction, and also the grip's vertical off-set (Z axis position) which can be computed on the basis of R, OC and trigonometric relationships.

The distance and position of G relative to P has not changed, and thus no lateral movement of grip relative to plate support has occurred.

FIG. 18C illustrates a more complex situation, where the utilisation of four of the five control modes is resulting in composite position changes of the light spots. Besides the plate support attaining an arbitrary position in the X-Y plane as defined by P, the finger grip is rotated thirty degrees clock-wise and bent towards 10.30 (clock position) as defined by the position of B and C. At the same time the grip is moved laterally in a 4.30 direction relative to the plate support, as indicated by the position of G. All parameters can be computed on the basis of detected spot addresses, unambiguously defining the spatial orientation of the control members.

Figure 19A:
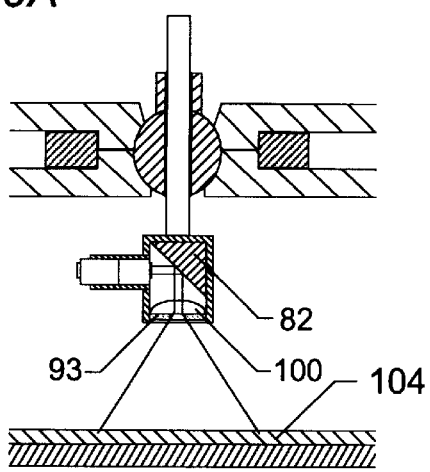
Figure 19B:
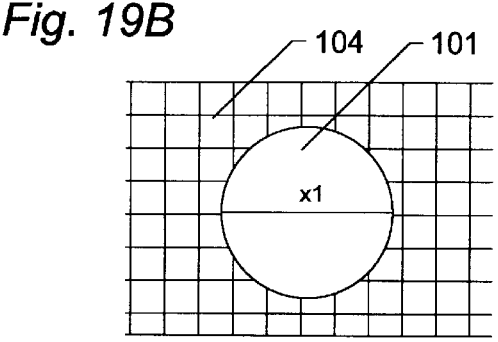
Figure 19C:
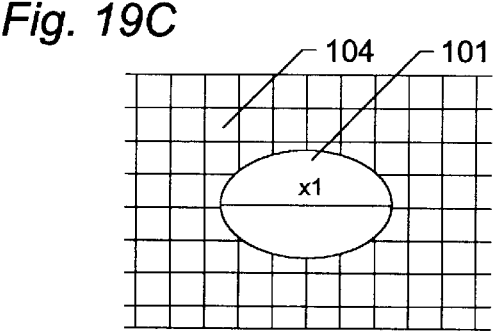
Figure 19D:
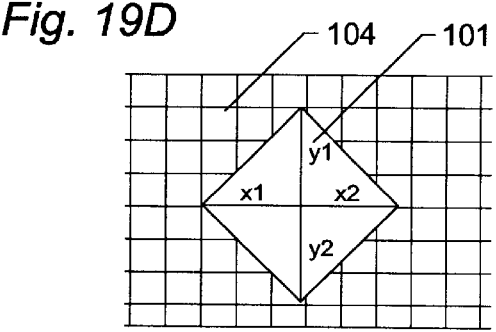
Figure 19E:
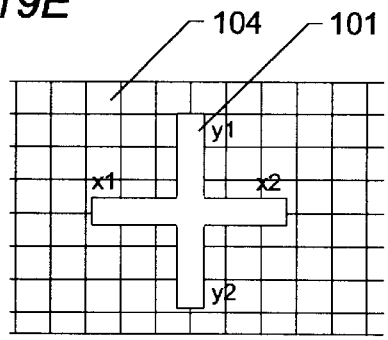
Figure 19F:
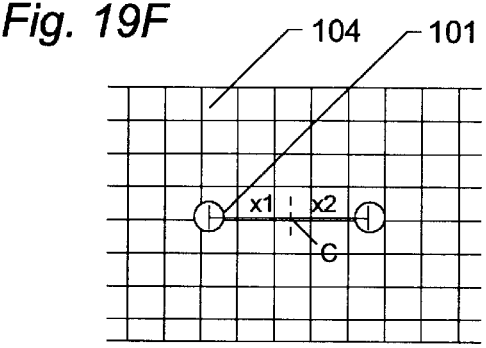
Figure 19G:
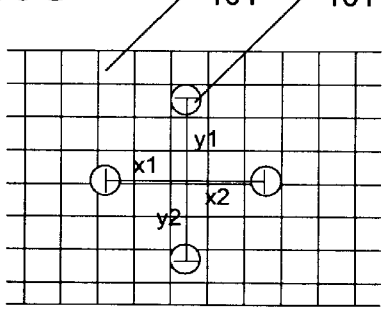
Figure 19H:
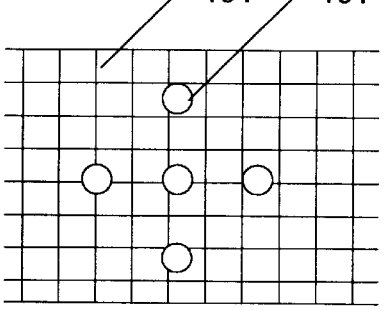

Instead of using a two-component beam for determining the spatial orientation of the finger grip, other beam shapes and patterns can be used. Some of these are shown in FIGS. 19A–H, where FIG. 19A illustrates that the beam (or bundle of beams) should be divergent (or alternatively, convergent) in a direction away from the beam director. This can be obtained by proper combinations of lenses, beam splitters, screens and apertures (93 and 100) as indicated. Except for the circular pattern indicated in FIG. 19B (which is not suitable for measuring rotation angle when the grip is in a normal position), all patterns can be utilised for position determination for all previously described control modes.

FIGS. 20 to 24 illustrate a second class of embodiments of the invention, where reference planes are connected to the control members and beam paths are fixed. A change of orientation of a control members is thus associated with a change of position of the reference planes, and consequently the beam's impact spot. This group of devices requires the use of several reference planes, and the construction is more complicated than for the class of embodiments described above. The main differences are associated with the beam-conducting system and utilities used for the positioning of reference planes. The operation of the five control modes are identical to operations described above. The use of an array of addressable, light-sensitive units on the surface of the reference planes is also identical to the sensor array described earlier. This class of embodiments can also make use of optical fibres for conducting beams from a laser source towards the reference planes, which may in many circumstances be preferred. However, in order to illustrate that the invention allows for other beam-guiding means, reflecting mirrors and lenses are utilised as beam guides in the following descriptions.

FIG. 20 is a cross-section of the device, showing the finger grip 2, a laser 11, a beam splitter 12, a beam guide 13, a signal analyser/processor 15, and one reference plane 7. The guides confining the plate movement to one plane and at the same time preventing the plate from being rotated are shown (3, 4, 34, 35 and 36). Reference plane 7 is attached to the device housing 6, and will determine the lateral position of the control members relative to the housing.

FIG. 21 is a detailed cross-sectional view of the beam guide, also showing the coupling between the ball-hinge 25 and the reference plane 9 incorporating a spring-loaded plunger positioned in a recess on top of the plane 9. A detailed view of this reference plane is given in FIG. 24. FIG. 21 further illustrates that the beam guide encompasses beam-reflecting mirrors (43, 44, 45 and 46), directing the laser beams towards the various reference planes. The figure also indicates that the optical fibre 38 responsible for con-ducting the laser beam to the grip's reference plane is held in position while at the same time being allowed to move vertically in a bore in the fastening clamps.

A horizontal cross-section of the beam guide 13 is shown in FIG. 22, where 11 represents the laser source, 12 the beam splitter, 50 the guide housing, 43–46 the mirrors, 8 and 9 are indications of the positions of the circular reference planes, and 15 the analyser/processor.

FIG. 23 shows details of the beam splitter incorporating totally reflecting and half-silvered mirrors, generating four separate, parallel beams.

FIG. 25 illustrates part of a representative of a third class of embodiments of the invention. This embodiment utilises reference planes with address-carrying pixels, demanding utilities for analysing reflected beams. Technologically, this embodiment is similar to the one described in FIGS. 20–24, with the exception that this device incorporates a reflecting mirror 42 and a light sensor or sensor array 14 capable of analysing light pulses or patterns of reflecting/non-reflecting areas in the pixel addresses. Beam paths, both of beams directed towards, and of beams reflected from the reference planes are illustrated in FIG. 26.

Since light pulses are simpler to handle analytically than patterns, the device preferably incorporates a scanning utility, e.g. a provision that makes the laser beam scan defined areas of the reference planes, in combination with a timing device. Sequential scanning of reference planes will further limit the use of analysers to one single light sensor. Other similar or equivalent solutions will be familiar to persons skilled in the art.

FIG. 27 gives an example of an address-carrying pixel 66, where X- and Y- co-ordinates are presented in binary form, separated by a non-reflecting area 70. The pixel has also a blank, reflecting border 69, separating it from its neighbour-ing pixels. The address is made up of a sequence of reflecting 67 and non-reflecting sub-units. The pattern, here considerably idealised, is prepared by laser-engravement, magneto-polarisation or deposition of a non-reflective mate-rial upon an otherwise reflecting surface. FIG. 28 illustrates an array of pixels 66. Reflecting sub-section may have the value of 1 (one), and a non-reflecting sub-section the value of 0 (zero); or alternatively other values depending upon the width, spacing and combinations of sub-sections.

FIG. 29 illustrates the use of a "one-dimensional" address pattern, identifying X- and Y-co-ordinates by particular groups of reflecting and non-reflecting stripes positioned to the left of the digitised address. A one-dimensional laser scan 72 can be employed for reading this address.

FIGS. 30 and 31 illustrate the use of two different switch options, where in FIG. 31 the switching function is coupled to a depression or retraction of the grip's cap, enabled through a coupling of the grip's piston to a micro-swithch 21; while in FIG. 32 the swithching function is performed by depressing a separate button 74, which can be done in any vertical position.

FIG. 32 illustrates how the described invention can be used as basis for a hand-grippable device.

FIGS. 33A–G illustrate the different modes of operation of the device. FIG. 31A shows the device in its normal position. A computer monitor 77 displays a hexagonal pyramid 78 positioned in a three-dimensional co-ordinate system 79. With the pyramid selected, a lateral (XY) move-ment of the finger-grip in X-direction will move the pyramid to the right, as shown in FIG. 31B. FIG. 31C illustrates the effect of a rotation (R), turning the pyramid around the Z-axis. Lifting the finger grip in positive Z-direction as shown in FIG. 31D will move the pyramid upwards. A pivotal movement (P) in a one o'clock direction will insti-gate a similar tilting of the pyramid, as shown in FIG. 31E, while a subsequent tilting movement in a three o'clock direction will cause a similar tilting of the pyramid. Finally, a lateral movement (L) of the finger grip relative to the plate support will instigate a scrolling movement, transposing the co-ordinate system (together with other, non-selected objects) to the left on the screen.

What is claimed is:

1. A device for positioning and controlling computer cursors and other virtual or real objects in two or the dimensions; said device comprising:

two position control modules including a plate support and a finger- or hand-grippable member, said grippable member being vertically attached to said plate support, said plate support being movable in all directions within an X-Y co-ordinate plane via said grippable member, and said grippable member being vertically movable along a Z-axis and rotatable around said Z-axis relative to said co-ordinate plane;

switching means located in said grippable member;

detector means for determining a position of said plate support and a spatial orientation of said grippable member; and means for converting position, orientation and switching information to electrical signals indicative thereof, said signals being used to control position, orientation, direction of movement, speed and other properties of said cursor or objects, wherein said position and said spatial orientation of said plate support and said grippable member are defined by discrete light beams emitted from sources connected to said position control modules, wherein said beams irradiate one or more reference planes in the form of delimited light spots whose locations on said reference planes change according to any change of position and orientation of said control modules, wherein said locations of said light spots are detected by sensor means operable to identify addresses or co-ordinates relative to said reference planes, wherein said addresses or co-ordinates are used to define said position and said spatial orientation of said control modules, and wherein each said reference plane is subdivided into pixels, each said pixel containing a pattern that encodes information about position information interpreted by address reading means.

2. The device according to claim 1, wherein said grippable member is resiliently attached and inclined in any direction relative to said plate support, said plate support being movable in any direction in said co-ordinate plane, and said position of said plate support and said orientation of said grippable member relative to said plate support are used simultaneously for said cursor or object control.

3. The device according to claim 1, wherein said grippable member is resiliently attached to and laterally movable relative to said plate support, the movement being parallel to said co-ordinate plane, said position of said plate support and said orientation of said grippable member relative to said plate support are used simultaneously for said cursor or object control.

4. The device according to claim 1, wherein a physical boundary delimiting an unobstructed movement of said plate support in said X-Y plane is resilient and allows said plate support to be forcibly displaced beyond said boundary in any horizontal direction, said position of said plate support and said orientation of said grippable member relative to said plate support are used simultaneously for said cursor or object control.

5. The device according to claim 1, wherein said light source is a laser source.

6. The device according to claim 1, wherein each reference plane on its surface contains an array of light detecting units, each said unit being identifiable by a specific address for localizing a point of impact of said light beams.

7. The device according to claim 6, wherein said array of light detecting units is at least one of photodiode arrays, charge coupled devices and active pixel sensors.

8. The device according to claim 1, wherein said position information encoded on said each pixel include specific patterns of light-reflecting and non-reflecting areas created by at least one of a laser-engravement, a magneto-polarization, a deposition of light-absorbing material, and other modifications of a light-reflecting surface in the form of at least one of dots, lines, rectangles, squares, circles, sectors and any other shapes, said pattern on said each pixel is encoding an address of said pixel as at least one of a binary code, a decimal code, a bar code and other code patterns that unambiguously defines a position of said pixel in said reference plane, and said address reading means comprise at least one of single light sensors and sensor arrays operable to interpret address information contained in said laser beams being reflected from said reference planes.

9. The device according to claim 1, wherein defining said position and said spatial orientation of said control modules, one single light beam is used to define said position of said plate support and said grippable member relative to stationary parts of said device.

10. The device according to claim 1, wherein defining said position and said spatial orientation of said control modules, one light beam is used to define said position of said plate support relative to stationary parts of said device, and one or more beams are used to define said orientation of said grippable member relative to said plate support.

11. The device according to claim 1, wherein said beams used for defining said position and said spatial orientation of said control modules are emitted in sequence.

12. A device for positioning and controlling computer cursors and other virtual or real objects in two or the dimensions; said device comprising:

two position control modules including a plate support and a finger- or hand-grippable member, said grippable member being vertically attached to said plate support, said plate support being movable in all directions within an X-Y co-ordinate plane via said grippable member, and said grippable member being vertically movable along a Z-axis and rotatable around said Z-axis relative to said co-ordinate plane;

switching means located in said grippable member;

detector means for determining a position of said plate support and a spatial orientation of said grippable member; and means for converting position, orientation and switching information to electrical signals indicative thereof, said signals being used to control position, orientation, direction of movement, speed and other properties of said cursor or objects, wherein said position and said spatial orientation of said plate support and said grippable member are defined by discrete light beams emitted from sources connected to said position control modules, wherein said beams irradiate one or more reference planes in the form of delimited light spots whose locations on said reference planes change according to any change of position and orientation of said control modules, wherein said locations of said light spots are detected by sensor means operable to identify addresses or co-ordinates relative to said reference planes, wherein said addresses or co-ordinates are used to define said position and said spatial orientation of said control modules, and wherein said beams being used to define said position and said orientation of said grippable member irradiate said reference plane as one or more spots having a form of at least one of a circle, a square and another geometric shape, at least one of a single beam and a group of beams are made to diverge or converge in a direction away from said beam source causing an impact pattern of said beam on said reference plane to change whenever said orientation of said grippable member is changed, said device further comprising computation means for interpreting said impact pattern in terms of said orientation of said grippable member.

13. The device according to claim 12, wherein said grippable member is resiliently attached and inclined in any direction relative to said plate support, said plate support being movable in any direction in said co-ordinate plane, and said position of the plate support and said orientation of said grippable member relative to said plate support are used simultaneously for cursor or object control.

14. The device according to claim 12, wherein said grippable member is resiliently attached to and laterally movable relative to said plate support, the movement being parallel to said co-ordinate plane, said position of said plate support and said orientation of said grippable member relative to said plate support are used simultaneously for said cursor or object control.

15. The device according to claim 12, wherein a physical boundary delimiting an unobstructed movement of said plate support in said X-Y plane is resilient and allows said plate support to be forcibly displaced beyond said boundary in any horizontal direction, said position of said plate support and said orientation of said grippable member relative to said plate support are used simultaneously for said cursor or object control.

16. The device according to claim 12, wherein said light source is a laser source.

17. The device according to claim 12, wherein each reference plane on its surface contains an array of light detecting units, each said unit being identifiable by a specific address for localizing a point of impact of said light beams.

18. The device according to claim 17, wherein said array of light detecting units is at least one of photodiode arrays, charge coupled devices and active pixel sensors.

19. The device according to claim 12, wherein each said reference plane is subdivided into pixels, each said pixel containing a pattern that encodes information about position information interpreted by address reading means.

20. The device according to claim 19, wherein said position information encoded on said each pixel include specific patterns of light-reflecting and non-reflecting areas created by at least one of a laser-engravement, a magneto-polarization, a deposition of light-absorbing material, and other modifications of a light-reflecting surface in the form of at least one of dots, lines, rectangles, squares, circles, sectors and any other shapes, said pattern on said each pixel is encoding an address of said pixel as at least one of a binary code, a decimal code, a bar code and other code patterns that unambiguously defines a position of said pixel in said reference plane, and said address reading means comprise at least one of single light sensors and sensor arrays operable to interpret address information contained in said laser beams being reflected from said reference planes.

21. The device according to claim 12, wherein defining said position and said spatial orientation of said control modules, one single light beam is used to define said position of said plate support and said grippable member relative to stationary parts of said device.

22. The device according to claim 12, wherein defining said position and said spatial orientation of said control modules, one light beam is used to define said position of said plate support relative to stationary parts of said device, and one or more beams are used to define said orientation of said grippable member relative to said plate support.

23. The device according to claim 12, wherein said beams used for defining said position and said spatial orientation of said control modules are emitted in sequence.

24. The device according to claim 12, wherein a displacement of said plate support initiates a congruent or similar displacement or movement of said cursor or object in an X-Y plane, while a displacement of said grippable member relative to said plate support is used for one or more control purposes; a vertical displacement of said grippable member relative to said plate support is used to control said movement of said cursor or object along said Z-axis in a three-dimensional co-ordinate system; and a rotation of said grippable member is used for rotating objects around said Z-axis, wherein when said device is used in conjunction with one or more of the above mentioned control modes:
a) a bending of said grippable member initiates at least one of a rotation of said cursor or object around an axis in said X-Y plane, and initiates a continuous, lateral movement in said X-Y plane, said bending direction and inclination angle relative to said plate support determines said direction and speed of movement;
b) a lateral movement of said grippable member relative to said plate support or a lateral, forced displacement of said plate support beyond unobstructed motion boundary initiates a continuous movement of said cursor or object in said X-Y plane; wherein a direction and magnitude of said lateral displacement of a grip or plate from their normal positions determines said direction and speed of said movement;
c) at least one of a bending and a lateral displacement is used for scrolling purposes; and a vertical displacement of said grippable member relative to said plate support is used to activate a switch connected to said grippable member, wherein a retraction of said grip from the normal position will interrupt signal transduction or have an effect similar to a right mouse button and a depression of said grip will mimic a left mouse button, or lifting and depressing said grip is used for combining Z-axis movement and switching movements.

25. A device for positioning and controlling computer cursors and other virtual or real objects in two or the dimensions; said device comprising:

two position control modules including a plate support and a finger- or hand-grippable member, said grippable member being vertically attached to said plate support, said plate support being movable in all directions within an X-Y co-ordinate plane via said grippable member, and said grippable member being vertically movable along a Z-axis and rotatable around said Z-axis relative to said co-ordinate plane;

switching means located in said grippable member;

detector means for determining a position of said plate support and a spatial orientation of said grippable member; and means for converting position, orientation and switching information to electrical signals indicative thereof, said signals being used to control position, orientation, direction of movement, speed and other properties of said cursor or objects, wherein said position and said spatial orientation of said plate support and said grippable member are defined by discrete light beams emitted from sources connected to said position control modules, wherein said beams irradiate one or more reference planes in the form of delimited light spots whose locations on said reference planes change according to any change of position and orientation of said control modules, wherein said locations of said light spots are detected by sensor means operable to identify addresses or co-ordinates relative to said reference planes, wherein said addresses or co-ordinates are used to define said position and said spatial orientation of said control modules, wherein a displacement of said plate support initiates a congruent or similar displacement or movement of said cursor or object in an X-Y plane, while a displacement of said grippable member relative to said plate support is used for one or more control purposes; a vertical displacement of said grippable member relative to said plate support is used to control said movement of said cursor or object along said Z-axis in a three-dimensional co-ordinate system; and a rotation of said grippable member is used for rotating objects around said Z-axis, and wherein when said device is used in conjunction with one or more of the above mentioned control modes:

a) a bending of said grippable member initiates at least one of a rotation of said cursor or object around an axis in said X-Y plane, and initiates a continuous, lateral movement in said X-Y plane, said bending direction and inclination angle relative to said plate support determines said direction and speed of movement;

b) a lateral movement of said grippable member relative to said plate support or a lateral, forced displacement of said plate support beyond unobstructed motion boundary initiates a continuous movement of said cursor or object in said X-Y plane; wherein a direction and magnitude of said lateral displacement of a grip or plate from their normal positions determines said direction and speed of said movement;

c) at least one of a bending and a lateral displacement is used for scrolling purposes; and d) a vertical displacement of said grippable member relative to said plate support is used to activate a switch connected to said grippable member, wherein a retraction of said grip from the normal position will interrupt signal transduction or have an effect similar to a right mouse button and a depression of said grip will mimic a left mouse button, or lifting and depressing said grip is used for combining Z-axis movement and switching movements.

26. The device according to claim 25, wherein said grippable member is resiliently attached and inclined in any direction relative to said plate support, said plate support being movable in any direction in said co-ordinate plane, and said position of the plate support and said orientation of said grippable member relative to said plate support are used simultaneously for cursor or object control.

27. The device according to claim 25, wherein said grippable member is resiliently attached to and laterally movable relative to said plate support, the movement being parallel to said co-ordinate plane, said position of said plate support and said orientation of said grippable member relative to said plate support are used simultaneously for said cursor or object control.

28. The device according to claim 25, wherein a physical boundary delimiting an unobstructed movement of said plate support in said X-Y plane is resilient and allows said plate support to be forcibly displaced beyond said boundary in any horizontal direction, said position of said plate support and said orientation of said grippable member relative to said plate support are used simultaneously for said cursor or object control.

29. The device according to claim 25, wherein said light source is a laser source.

30. The device according to claim 25, wherein each reference plane on its surface contains an array of light detecting units, each said unit being identifiable by a specific address for localizing a point of impact of said light beams.

31. The device according to claim 30, wherein said array of light detecting units is at least one of photodiode arrays, charge coupled devices and active pixel sensors.

32. The device according to claim 25, wherein each said reference plane is subdivided into pixels, each said pixel containing a pattern that encodes information about position information interpreted by address reading means.

33. The device according to claim 32, wherein said position information encoded on said each pixel include specific patterns of light-reflecting and non-reflecting areas created by at least one of a laser-engravement, a magneto-polarization, a deposition of light-absorbing material, and other modifications of a light-reflecting surface in the form of at least one of dots, lines, rectangles, squares, circles, sectors and any other shapes, said pattern on said each pixel is encoding an address of said pixel as at least one of a binary code, a decimal code, a bar code and other code patterns that unambiguously defines a position of said pixel in said reference plane, and said address reading means comprise at least one of single light sensors and sensor arrays operable to interpret address information contained in said laser beams being reflected from said reference planes.

34. A device according to claim 25, wherein said beams being used to define said position and said orientation of said grippable member irradiate said reference plane as one or more spots having a form of at least one of a circle, a square and another geometric shape, at least one of a single beam and a group of beams are made to diverge or converge in a direction away from said beam source causing an impact pattern of said beam on said reference plane to change whenever said orientation of said grippable member is changed, said device further comprising computation means for interpreting said impact pattern in terms of said orientation of said grippable member.

35. The device according to claim 25, wherein defining said position and said spatial orientation of said control modules, one single light beam is used to define said position of said plate support and said grippable member relative to stationary parts of said device.

36. The device according to claim 25, wherein defining said position and said spatial orientation of said control modules, one light beam is used to define said position of said plate support relative to stationary parts of said device, and one or more beams are used to define said orientation of said grippable member relative to said plate support.

37. The device according to claim 25, wherein said beams used for defining said position and said spatial orientation of said control modules are emitted in sequence.

* * * * *